US00RE48504E

(19) United States
(12) Reissued Patent
Hall

(10) Patent Number: US RE48,504 E
(45) **Date of Reissued Patent: *Apr. 6, 2021**

(54) HIGH DEFINITION LIDAR SYSTEM

(71) Applicant: Velodyne Lidar USA, Inc., San Jose, CA (US)

(72) Inventor: David S. Hall, San Jose, CA (US)

(73) Assignee: VELODYNE LIDAR USA, INC., San Jose, CA (US)

( * ) Notice: This patent is subject to a terminal disclaimer.

(21) Appl. No.: 15/700,836

(22) Filed: Sep. 11, 2017

Related U.S. Patent Documents

Reissue of:
(64) Patent No.: 8,767,190
Issued: Jul. 1, 2014
Appl. No.: 13/109,901
Filed: May 17, 2011

U.S. Applications:
(63) Continuation of application No. 15/180,580, filed on Jun. 13, 2016, now Pat. No. Re. 46,672, which is an application for the reissue of Pat. No. 8,767,190, which is a continuation-in-part of application No. 11/777,802, filed on Jul. 13, 2007, now Pat. No. 7,969,558.

(60) Provisional application No. 61/345,505, filed on May 17, 2010, provisional application No. 60/807,305, filed on Jul. 13, 2006.

(51) Int. Cl.
*G01S 7/481* (2006.01)
*G01S 17/89* (2020.01)

(52) U.S. Cl.
CPC ..... *G01S 7/4813* (2013.01); *G01S 17/89* (2013.01)

(58) Field of Classification Search
CPC ..... G01S 7/4813; G01S 17/89
USPC ..... 356/5.01, 3.01, 4.01, 4.07, 5.09, 9, 625; 382/103, 105, 154; 358/453, 475, 480
See application file for complete search history.

(56) References Cited

U.S. PATENT DOCUMENTS 3,064,252 A 11/1962 Varela
3,373,441 A 3/1968 Zadig
3,551,845 A 12/1970 Zelina
(Continued)

FOREIGN PATENT DOCUMENTS

CA 2089105 A1 8/1994
CH 641583 A5 2/1984
(Continued)

OTHER PUBLICATIONS

Juberts, et al., "Status report on next generation LADAR for driving unmanned ground vehicles" Mobile Robots XVII, edited by Douglas W. Gage, Proceedings of SPIE, vol. 5609, pp. 1-12, 2004.
(Continued)

*Primary Examiner* — Kenneth Whittington
(74) *Attorney, Agent, or Firm* — Goodwin Procter LLP

(57) ABSTRACT

A LiDAR-based 3-D point cloud measuring system includes a base, a housing, a plurality of photon transmitters and photon detectors contained within the housing, a rotary motor that rotates the housing about the base, and a communication component that allows transmission of signals generated by the photon detectors to external components. In several versions of the invention, the system includes a vertically oriented motherboard, thin circuit boards such as ceramic hybrids for selectively mounting emitters and detectors, a conjoined D-shaped lens array, and preferred firing sequences.

10 Claims, 12 Drawing Sheets

(56) References Cited

U.S. PATENT DOCUMENTS 3,636,250 A 1/1972 Haeff
3,686,514 A 8/1972 Dube
3,781,111 A 12/1973 Fletcher
3,862,415 A 1/1975 Harnden, Jr. et al.
3,897,150 A 7/1975 Bridges
3,921,081 A 11/1975 Lane
4,179,216 A 12/1979 Theurer
4,199,697 A 4/1980 Edwards
4,201,442 A 5/1980 McMahon et al.
4,212,534 A 7/1980 Bodlaj
4,220,103 A 9/1980 Kasahara et al.
4,477,184 A 10/1984 Endo
4,516,837 A 5/1985 Soref et al.
4,634,272 A 1/1987 Endo
4,656,462 A 4/1987 Araki et al.
4,681,433 A 7/1987 Aeschlimann
4,700,301 A 10/1987 Dyke
4,730,932 A 3/1988 Iga et al.
4,742,337 A 5/1988 Haag
4,834,531 A 5/1989 Ward
4,862,257 A 8/1989 Ulich
4,895,440 A 1/1990 Cain et al.
4,896,343 A 1/1990 Saunders
4,902,126 A 2/1990 Koechner
4,944,036 A 7/1990 Hyatt
4,952,911 A 8/1990 D'Ambrosia et al.
4,967,183 A 10/1990 D'Ambrosia et al.
5,004,916 A 4/1991 Collins, Jr.
5,006,721 A 4/1991 Cameron et al.
5,023,888 A 6/1991 Bayston
5,026,156 A 6/1991 Bayston et al.
5,033,819 A 7/1991 Tanaka
5,059,008 A 10/1991 Flood et al.
5,175,694 A 12/1992 Amato
5,177,768 A 1/1993 Crespo et al.
5,210,586 A 5/1993 Grage et al.
5,212,533 A * 5/1993 Shibuya et al. ..... 356/5.15
5,241,481 A 8/1993 Olsen
5,249,157 A 9/1993 Taylor
5,291,261 A 3/1994 Dahl et al.
5,309,212 A 5/1994 Clark
5,314,037 A 5/1994 Shaw et al.
5,319,201 A 6/1994 Lee
5,357,331 A 10/1994 Flockencier
5,365,218 A 11/1994 Otto
5,463,384 A 10/1995 Juds
5,465,142 A 11/1995 Krumes et al.
5,515,156 A 5/1996 Yoshida et al.
5,546,188 A 8/1996 Wangler et al.
5,563,706 A 10/1996 Shibuya et al.
5,572,219 A 11/1996 Silverstein et al.
5,691,687 A 11/1997 Kumagai
5,710,417 A 1/1998 Joseph et al.
5,757,472 A 5/1998 Wangler et al.
5,757,501 A 5/1998 Hipp
5,757,677 A 5/1998 Lennen
5,789,739 A 8/1998 Schwarz
5,793,163 A 8/1998 Okuda
5,793,491 A 8/1998 Wangler et al.
5,805,468 A 9/1998 Blohbaum
5,847,817 A 12/1998 Zediker et al.
5,877,688 A 3/1999 Morinaka et al.
5,889,479 A 3/1999 Tabel
5,895,984 A 4/1999 Renz
5,903,355 A 5/1999 Schwarz
5,903,386 A 5/1999 Mantravadi et al.
5,923,910 A 7/1999 Nakahara et al.
5,942,688 A 8/1999 Kimura et al.
5,949,530 A 9/1999 Wetteborn
5,953,110 A 9/1999 Burns
5,991,011 A 11/1999 Damm
6,034,803 A 3/2000 Sullivan et al.
6,043,868 A 3/2000 Dunne
6,069,565 A 5/2000 Stern et al.
6,088,085 A 7/2000 Wetteborn
6,091,071 A 7/2000 Franz et al.
6,100,539 A 8/2000 Blumcke et al.
6,137,566 A 10/2000 Leonard et al.
6,153,878 A 11/2000 Jakob et al.
6,157,294 A 12/2000 Urai et al.
6,201,236 B1 3/2001 Juds
6,259,714 B1 7/2001 Kinbara
6,297,844 B1 10/2001 Schatz et al.
6,321,172 B1 11/2001 Jakob et al.
6,327,806 B1 12/2001 Paige
6,329,800 B1 12/2001 May
6,335,789 B1 * 1/2002 Kikuchi ..... 356/141.1
6,365,429 B1 4/2002 Kneissl et al.
6,396,577 B1 5/2002 Ramstack
6,420,698 B1 7/2002 Dimsdale
6,441,363 B1 8/2002 Cook, Jr. et al.
6,441,889 B1 * 8/2002 Patterson ..... 356/28
6,442,476 B1 8/2002 Poropat
6,473,079 B1 10/2002 Kacyra et al.
6,504,712 B2 * 1/2003 Hashimoto et al. ..... 361/679.54
6,509,958 B2 1/2003 Pierenkemper
6,593,582 B2 7/2003 Lee et al.
6,621,764 B1 9/2003 Smith
6,636,300 B2 10/2003 Doemens et al.
6,646,725 B1 11/2003 Eichinger et al.
6,650,402 B2 * 11/2003 Sullivan et al. ..... 356/4.01
6,664,529 B2 12/2003 Pack et al.
6,665,063 B2 12/2003 Jamieson et al.
6,670,905 B1 12/2003 Orr
6,682,478 B2 * 1/2004 Nakamura ..... 600/111
6,687,373 B1 2/2004 Yeh et al.
6,710,324 B2 3/2004 Hipp
6,742,707 B1 6/2004 Tsikos et al.
6,747,747 B2 6/2004 Hipp
6,759,649 B2 7/2004 Hipp
6,789,527 B2 9/2004 Sauler et al.
6,812,450 B2 11/2004 Hipp
6,876,790 B2 4/2005 Lee
6,879,419 B2 4/2005 Richman et al.
6,969,558 B2 11/2005 Walston et al.
7,030,968 B2 4/2006 D'Aligny et al.
7,041,962 B2 5/2006 Dollmann et al.
7,089,114 B1 8/2006 Huang
7,106,424 B2 * 9/2006 Meneely et al. ..... 356/5.01
7,129,971 B2 10/2006 McCutchen
7,130,672 B2 10/2006 Pewzner
7,131,586 B2 11/2006 Tsikos et al.
7,190,465 B2 3/2007 Froehlich et al.
7,240,314 B1 7/2007 Leung
7,248,342 B1 7/2007 Degnan
7,281,891 B2 10/2007 Smith et al.
7,295,298 B2 11/2007 Willhoeft et al.
7,313,424 B2 12/2007 Mayevsky
7,315,377 B2 1/2008 Holland et al.
7,319,777 B2 1/2008 Morcom
7,345,271 B2 3/2008 Boehlau et al.
7,358,819 B2 4/2008 Rollins
7,373,473 B2 5/2008 Bukowski et al.
7,408,462 B2 8/2008 Pirkl et al.
7,477,360 B2 1/2009 England et al.
7,480,031 B2 1/2009 Mack
7,544,945 B2 6/2009 Tan et al.
7,570,793 B2 8/2009 Lages et al.
7,583,364 B1 9/2009 Mayor et al.
7,589,826 B2 9/2009 Mack et al.
7,619,477 B2 11/2009 Segarra
7,623,222 B2 11/2009 Benz et al.
7,640,068 B2 12/2009 Johnson et al.
7,642,946 B2 1/2010 Wong et al.
7,684,590 B2 3/2010 Kampchen et al.
7,697,581 B2 4/2010 Walsh et al.
7,741,618 B2 6/2010 Lee et al.
7,746,271 B2 6/2010 Furstenberg
7,868,665 B2 1/2011 Tumer et al.
7,944,548 B2 5/2011 Eaton
7,969,558 B2 6/2011 Hall
8,042,056 B2 10/2011 Wheeler et al.
8,072,582 B2 12/2011 Meneely
8,077,047 B2 12/2011 Humble et al.

(56) References Cited

U.S. PATENT DOCUMENTS 8,139,685 B2 3/2012 Simic et al.
8,203,702 B1 6/2012 Kane et al.
8,274,037 B2 9/2012 Ritter et al.
8,310,653 B2 11/2012 Ogawa et al.
8,451,432 B2 5/2013 Crawford et al.
8,605,262 B2 12/2013 Campbell et al.
8,675,181 B2 3/2014 Hall
8,736,818 B2 5/2014 Weimer et al.
8,767,190 B2 7/2014 Hall
8,875,409 B2 11/2014 Kretschmer et al.
8,976,340 B2 3/2015 Gilliland et al.
8,995,478 B1 3/2015 Kobtsev et al.
9,059,562 B2 6/2015 Priest et al.
9,063,549 B1 6/2015 Pennecot et al.
9,069,061 B1 6/2015 Harwit
9,069,080 B2 6/2015 Stettner et al.
9,086,273 B1 7/2015 Gruver et al.
9,093,969 B2 7/2015 Gebeyehu et al.
9,110,154 B1 8/2015 Bates et al.
9,151,940 B2 10/2015 Chuang et al.
9,191,260 B1 11/2015 Grund
9,194,701 B2 11/2015 Bosch
RE45,854 E 1/2016 Gittinger et al.
9,239,959 B1 1/2016 Evans et al.
9,246,041 B1 1/2016 Clausen et al.
9,250,327 B2 2/2016 Kelley et al.
9,285,477 B1 3/2016 Smith et al.
9,286,538 B1 3/2016 Chen et al.
9,310,197 B2 4/2016 Gogolla et al.
9,383,753 B1 7/2016 Templeton et al.
9,453,914 B2 9/2016 Stettner et al.
9,529,079 B1 12/2016 Droz et al.
9,772,607 B2 9/2017 Decoux et al.
RE46,672 E * 1/2018 Hall
9,964,632 B1 5/2018 Droz et al.
9,983,297 B2 5/2018 Hall et al.
9,989,629 B1 6/2018 LaChapelle
10,003,168 B1 6/2018 Villeneuve
10,018,726 B2 7/2018 Hall et al.
10,048,374 B2 8/2018 Hall et al.
10,094,925 B1 10/2018 LaChapelle
10,109,183 B1 10/2018 Franz et al.
10,120,079 B2 11/2018 Pennecot et al.
10,126,412 B2 11/2018 Eldada et al.
10,132,928 B2 11/2018 Eldada et al.
10,309,213 B2 6/2019 Barfoot et al.
10,330,780 B2 6/2019 Hall et al.
10,386,465 B2 8/2019 Hall et al.
10,393,874 B2 8/2019 Schmidtke et al.
10,393,877 B2 8/2019 Hall et al.
10,436,904 B2 10/2019 Moss et al.
10,545,222 B2 1/2020 Hall et al.
RE47,942 E 4/2020 Hall
10,613,203 B1 4/2020 Rekow et al.
10,627,490 B2 4/2020 Hall et al.
10,627,491 B2 4/2020 Hall et al.
10,712,434 B2 7/2020 Hall et al.
2001/0011289 A1 8/2001 Davis et al.
2001/0017718 A1 8/2001 Ikeda et al.
2002/0003617 A1 1/2002 Doemens et al.
2002/0060784 A1 5/2002 Pack et al.
2002/0117545 A1 8/2002 Tsikos et al.
2003/0041079 A1 2/2003 Bellemore et al.
2003/0043363 A1 3/2003 Jamieson et al.
2003/0043364 A1 3/2003 Jamieson et al.
2003/0057533 A1 3/2003 Lemmi et al.
2003/0066977 A1 4/2003 Hipp et al.
2003/0076485 A1 4/2003 Ruff et al.
2003/0090646 A1 5/2003 Riegl et al.
2003/0163030 A1* 8/2003 Arriaga ..... 600/182
2004/0021852 A1 2/2004 DeFlumere
2004/0066500 A1 4/2004 Gokturk et al.
2004/0134879 A1 7/2004 Kochergin et al.
2004/0150810 A1 8/2004 Muenter et al.
2004/0213463 A1 10/2004 Morrison
2004/0240706 A1 12/2004 Wallace et al.
2004/0240710 A1 12/2004 Lages et al.
2004/0247157 A1 12/2004 Lages et al.
2005/0023353 A1 2/2005 Tsikos et al.
2005/0168720 A1 8/2005 Yamashita et al.
2005/0211893 A1 9/2005 Paschalidis
2005/0232466 A1 10/2005 Kampchen et al.
2005/0246065 A1 11/2005 Ricard
2005/0248749 A1 11/2005 Kiehn et al.
2005/0279914 A1 12/2005 Dimsdale et al.
2006/0007350 A1 1/2006 Gao et al.
2006/0089765 A1 4/2006 Pack et al.
2006/0100783 A1 5/2006 Haberer et al.
2006/0115113 A1 6/2006 Lages et al.
2006/0132635 A1 6/2006 Land
2006/0176697 A1 8/2006 Arruda
2006/0186326 A1 8/2006 Ito
2006/0197867 A1 9/2006 Johnson et al.
2006/0231771 A1 10/2006 Lee et al.
2006/0290920 A1 12/2006 Kampchen et al.
2007/0035624 A1 2/2007 Lubard et al.
2007/0071056 A1 3/2007 Chen
2007/0121095 A1 5/2007 Lewis
2007/0181810 A1 8/2007 Tan et al.
2007/0201027 A1 8/2007 Doushkina et al.
2007/0219720 A1 9/2007 Trepagnier et al.
2007/0241955 A1 10/2007 Brosche
2007/0272841 A1 11/2007 Wiklof
2008/0002176 A1 1/2008 Krasutsky
2008/0013896 A1* 1/2008 Salzberg et al. ..... 385/89
2008/0074640 A1 3/2008 Walsh et al.
2008/0079371 A1 4/2008 Kang et al.
2008/0154495 A1 6/2008 Breed
2008/0170826 A1 7/2008 Schaafsma
2008/0186501 A1 8/2008 Xie
2008/0302971 A1 12/2008 Hyde et al.
2009/0010644 A1 1/2009 Varshneya et al.
2009/0026503 A1 1/2009 Tsuda
2009/0085901 A1 4/2009 Antony
2009/0122295 A1 5/2009 Eaton
2009/0142053 A1 6/2009 Varshneya et al.
2009/0168045 A1 7/2009 Lin et al.
2009/0218475 A1 9/2009 Kawakami et al.
2009/0245788 A1 10/2009 Varshneya et al.
2009/0323737 A1 12/2009 Ensher et al.
2010/0006760 A1 1/2010 Lee et al.
2010/0020306 A1 1/2010 Hall
2010/0045965 A1 2/2010 Meneely
2010/0046953 A1 2/2010 Shaw et al.
2010/0067070 A1 3/2010 Mamada et al.
2010/0073780 A1 3/2010 Ito
2010/0074532 A1 3/2010 Gordon et al.
2010/0134596 A1 6/2010 Becker
2010/0188722 A1 7/2010 Yamada et al.
2010/0198487 A1 8/2010 Vollmer et al.
2010/0204964 A1 8/2010 Pack et al.
2010/0239139 A1 9/2010 Hunt et al.
2010/0265077 A1 10/2010 Humble et al.
2010/0271615 A1 10/2010 Sebastian et al.
2010/0302528 A1 12/2010 Hall
2011/0028859 A1 2/2011 Chian
2011/0040482 A1 2/2011 Brimble et al.
2011/0176183 A1 7/2011 Ikeda et al.
2011/0211188 A1 9/2011 Juenemann et al.
2011/0216304 A1 9/2011 Hall
2011/0305250 A1 12/2011 Chann et al.
2012/0038903 A1 2/2012 Weimer et al.
2012/0195597 A1 8/2012 Malaney
2012/0287417 A1 11/2012 Mimeault
2013/0024176 A2 1/2013 Woodford
2013/0038915 A1 2/2013 Kusaka et al.
2013/0050144 A1 2/2013 Reynolds
2013/0050486 A1 2/2013 Omer et al.
2013/0070239 A1 3/2013 Crawford et al.
2013/0093583 A1 4/2013 Shapiro
2013/0094960 A1 4/2013 Bowyer et al.
2013/0151198 A1 6/2013 Brown
2013/0168673 A1 7/2013 Yu et al.
2013/0206967 A1 8/2013 Shpunt et al.

(56) References Cited

U.S. PATENT DOCUMENTS

| | | | |
|---|---|---|---|
| 2013/0241761 | A1 | 9/2013 | Cooper et al. |
| 2013/0242283 | A1 | 9/2013 | Bailey et al. |
| 2013/0258312 | A1 | 10/2013 | Lewis |
| 2013/0286404 | A1 | 10/2013 | Cenko et al. |
| 2013/0300479 | A1 | 11/2013 | Thibault |
| 2013/0314711 | A1 | 11/2013 | Cantin et al. |
| 2013/0336375 | A1 | 12/2013 | Ranki et al. |
| 2013/0342366 | A1 | 12/2013 | Kiefer et al. |
| 2014/0063483 | A1 | 3/2014 | Li |
| 2014/0071234 | A1 | 3/2014 | Millett |
| 2014/0078519 | A1 | 3/2014 | Steffey et al. |
| 2014/0104592 | A1 | 4/2014 | Tien et al. |
| 2014/0176657 | A1 | 6/2014 | Nemoto |
| 2014/0240317 | A1 | 8/2014 | Go et al. |
| 2014/0240721 | A1 | 8/2014 | Herschbach |
| 2014/0253369 | A1 | 9/2014 | Kelley et al. |
| 2014/0259715 | A1 | 9/2014 | Engel |
| 2014/0267848 | A1 | 9/2014 | Wu |
| 2014/0274093 | A1 | 9/2014 | Abdelmonem |
| 2014/0347650 | A1 | 11/2014 | Bosch |
| 2015/0015895 | A1 | 1/2015 | Bridges et al. |
| 2015/0035437 | A1 | 2/2015 | Panopoulos et al. |
| 2015/0055117 | A1 | 2/2015 | Pennecot et al. |
| 2015/0101234 | A1 | 4/2015 | Priest et al. |
| 2015/0116695 | A1 | 4/2015 | Bartolome et al. |
| 2015/0131080 | A1 | 5/2015 | Retterath et al. |
| 2015/0144806 | A1 | 5/2015 | Jin et al. |
| 2015/0185325 | A1 | 7/2015 | Park et al. |
| 2015/0202939 | A1 | 7/2015 | Stettner et al. |
| 2015/0219764 | A1 | 8/2015 | Lipson |
| 2015/0219765 | A1 | 8/2015 | Mead et al. |
| 2015/0226853 | A1 | 8/2015 | Seo et al. |
| 2015/0293224 | A1 | 10/2015 | Eldada et al. |
| 2015/0293228 | A1 | 10/2015 | Retterath et al. |
| 2015/0303216 | A1 | 10/2015 | Tamaru |
| 2016/0003946 | A1 | 1/2016 | Gilliland et al. |
| 2016/0009410 | A1 | 1/2016 | Derenick et al. |
| 2016/0014309 | A1 | 1/2016 | Ellison et al. |
| 2016/0021713 | A1 | 1/2016 | Reed |
| 2016/0049058 | A1 | 2/2016 | Allen et al. |
| 2016/0098620 | A1 | 4/2016 | Geile |
| 2016/0117431 | A1 | 4/2016 | Kim et al. |
| 2016/0154105 | A1 | 6/2016 | Sigmund et al. |
| 2016/0161600 | A1 | 6/2016 | Eldada et al. |
| 2016/0191173 | A1 | 6/2016 | Malaney |
| 2016/0209499 | A1 | 7/2016 | Suzuki |
| 2016/0245919 | A1 | 8/2016 | Kalscheur et al. |
| 2016/0259038 | A1 | 9/2016 | Retterath et al. |
| 2016/0279808 | A1 | 9/2016 | Doughty et al. |
| 2016/0300484 | A1 | 10/2016 | Torbett |
| 2016/0306032 | A1 | 10/2016 | Schwarz et al. |
| 2016/0313445 | A1 | 10/2016 | Bailey et al. |
| 2016/0363659 | A1 | 12/2016 | Mindell et al. |
| 2016/0365846 | A1 | 12/2016 | Wyland |
| 2017/0146639 | A1 | 5/2017 | Carothers |
| 2017/0146640 | A1 | 5/2017 | Hall et al. |
| 2017/0153319 | A1 | 6/2017 | Villeneuve et al. |
| 2017/0214861 | A1 | 7/2017 | Rachlin et al. |
| 2017/0219695 | A1 | 8/2017 | Hall et al. |
| 2017/0220876 | A1 | 8/2017 | Gao et al. |
| 2017/0242102 | A1 | 8/2017 | Dussan et al. |
| 2017/0269198 | A1 | 9/2017 | Hall et al. |
| 2017/0269209 | A1 | 9/2017 | Hall et al. |
| 2017/0269215 | A1 | 9/2017 | Hall et al. |
| 2017/0299721 | A1 | 10/2017 | Eichenholz et al. |
| 2017/0350983 | A1 | 12/2017 | Hall et al. |
| 2018/0019155 | A1 | 1/2018 | Tsang et al. |
| 2018/0058197 | A1 | 3/2018 | Barfoot et al. |
| 2018/0059219 | A1 | 3/2018 | Irish et al. |
| 2018/0074382 | A1 | 3/2018 | Lee et al. |
| 2018/0100924 | A1 | 4/2018 | Brinkmeyer |
| 2018/0106902 | A1 | 4/2018 | Mase et al. |
| 2018/0168539 | A1 | 6/2018 | Singh et al. |
| 2018/0267151 | A1 | 9/2018 | Hall et al. |
| 2018/0275249 | A1 | 9/2018 | Campbell et al. |
| 2018/0284227 | A1 | 10/2018 | Hall et al. |
| 2018/0284274 | A1 | 10/2018 | LaChapelle |
| 2018/0321360 | A1 | 11/2018 | Hall et al. |
| 2018/0364098 | A1 | 12/2018 | McDaniel et al. |
| 2019/0001442 | A1 | 1/2019 | Unrath et al. |
| 2019/0011563 | A1 | 1/2019 | Hall et al. |
| 2019/0178991 | A1 | 6/2019 | Hall et al. |
| 2019/0339365 | A1 | 11/2019 | Hall et al. |
| 2019/0361092 | A1 | 11/2019 | Hall et al. |
| 2019/0369257 | A1 | 12/2019 | Hall et al. |
| 2019/0369258 | A1 | 12/2019 | Hall et al. |
| 2020/0025896 | A1 | 1/2020 | Gunnam |
| 2020/0064452 | A1 | 2/2020 | Avlas et al. |
| 2020/0142070 | A1 | 5/2020 | Hall et al. |
| 2020/0144971 | A1 | 5/2020 | Pinto et al. |
| 2020/0166613 | A1 | 5/2020 | Hall et al. |
| 2020/0191915 | A1 | 6/2020 | Hall et al. |

FOREIGN PATENT DOCUMENTS

| | | | |
|---|---|---|---|
| CN | 1106534 | A | 8/1995 |
| CN | 1576123 | A | 2/2005 |
| CN | 2681085 | Y | 2/2005 |
| CN | 2773714 | Y | 4/2006 |
| CN | 103278808 | B | 12/2015 |
| CN | 206773192 | U | 12/2017 |
| CN | 106443699 | B | 2/2019 |
| CN | 106597471 | B | 5/2019 |
| CN | 208902906 | U | 5/2019 |
| DE | 930909 | C | 7/1955 |
| DE | 3134815 | A1 | 3/1983 |
| DE | 3216312 | A1 | 11/1983 |
| DE | 3216313 | A1 | 11/1983 |
| DE | 3701340 | A1 | 7/1988 |
| DE | 3741259 | A1 | 6/1989 |
| DE | 3808972 | A1 | 10/1989 |
| DE | 3821892 | C1 | 2/1990 |
| DE | 4040894 | C1 | 4/1992 |
| DE | 4115747 | A1 | 11/1992 |
| DE | 4124192 | A1 | 1/1993 |
| DE | 4127168 | A1 | 2/1993 |
| DE | 4137550 | A1 | 3/1993 |
| DE | 4215272 | A1 | 11/1993 |
| DE | 4243631 | A1 | 6/1994 |
| DE | 4340756 | A1 | 6/1994 |
| DE | 4411448 | A1 | 10/1995 |
| DE | 4412044 | A1 | 10/1995 |
| DE | 19512644 | A1 | 10/1996 |
| DE | 19512681 | A1 | 10/1996 |
| DE | 4345446 | C2 | 7/1998 |
| DE | 4345448 | C2 | 7/1998 |
| DE | 19727792 | A1 | 2/1999 |
| DE | 19741730 | A1 | 4/1999 |
| DE | 19741731 | A1 | 4/1999 |
| DE | 19752145 | A1 | 5/1999 |
| DE | 19717399 | A1 | 6/1999 |
| DE | 19757847 | A1 | 7/1999 |
| DE | 19757848 | A1 | 7/1999 |
| DE | 19757849 | A1 | 7/1999 |
| DE | 19757840 | C1 | 9/1999 |
| DE | 19815149 | A1 | 10/1999 |
| DE | 19828000 | A1 | 1/2000 |
| DE | 19902903 | C1 | 5/2000 |
| DE | 19911375 | A1 | 9/2000 |
| DE | 19919925 | A1 | 11/2000 |
| DE | 19927501 | A1 | 11/2000 |
| DE | 19936440 | A1 | 3/2001 |
| DE | 19953006 | A1 | 5/2001 |
| DE | 19953007 | A1 | 5/2001 |
| DE | 19953009 | A1 | 5/2001 |
| DE | 19953010 | A1 | 5/2001 |
| DE | 10025511 | C1 | 12/2001 |
| DE | 10110420 | A1 | 9/2002 |
| DE | 10114362 | A1 | 10/2002 |
| DE | 10127417 | A1 | 12/2002 |
| DE | 10128954 | A1 | 12/2002 |
| DE | 10141055 | A1 | 3/2003 |
| DE | 10143060 | A1 | 3/2003 |
| DE | 10146692 | A1 | 4/2003 |

(56) References Cited

FOREIGN PATENT DOCUMENTS

| | | | |
|---|---|---|---|
| DE | 10148070 | A1 | 4/2003 |
| DE | 10151983 | A1 | 4/2003 |
| DE | 10162668 | A1 | 7/2003 |
| DE | 10217295 | A1 | 11/2003 |
| DE | 10222797 | A1 | 12/2003 |
| DE | 10229408 | A1 | 1/2004 |
| DE | 10244638 | A1 | 4/2004 |
| DE | 10244640 | A1 | 4/2004 |
| DE | 10244643 | A1 | 4/2004 |
| DE | 10258794 | A1 | 6/2004 |
| DE | 10303015 | A1 | 8/2004 |
| DE | 10331529 | A1 | 1/2005 |
| DE | 10341548 | A1 | 3/2005 |
| DE | 102004010197 | A1 | 9/2005 |
| DE | 102004014041 | A1 | 10/2005 |
| DE | 102005050824 | A1 | 5/2006 |
| DE | 102005003827 | A1 | 7/2006 |
| DE | 102005019233 | A1 | 11/2006 |
| DE | 102007013023 | A1 | 9/2008 |
| DE | 202015009250 | U1 | 1/2017 |
| EP | 0185816 | A1 | 7/1986 |
| EP | 0361188 | A2 | 4/1990 |
| EP | 0396865 | A2 | 11/1990 |
| EP | 0412395 | A1 | 2/1991 |
| EP | 0412398 | A1 | 2/1991 |
| EP | 0412399 | A1 | 2/1991 |
| EP | 0412400 | A1 | 2/1991 |
| EP | 0468175 | A2 | 1/1992 |
| EP | 0486430 | A2 | 5/1992 |
| EP | 0653720 | A2 | 5/1995 |
| EP | 0656868 | A1 | 6/1995 |
| EP | 0897120 | A2 | 2/1999 |
| EP | 0913707 | A1 | 5/1999 |
| EP | 0937996 | A2 | 8/1999 |
| EP | 0967492 | A1 | 12/1999 |
| EP | 1046938 | A2 | 10/2000 |
| EP | 1055937 | A2 | 11/2000 |
| EP | 1148345 | A1 | 10/2001 |
| EP | 1160718 | A2 | 12/2001 |
| EP | 1174733 | A2 | 1/2002 |
| EP | 1267177 | A1 | 12/2002 |
| EP | 1267178 | A1 | 12/2002 |
| EP | 1286178 | A2 | 2/2003 |
| EP | 1286181 | A1 | 2/2003 |
| EP | 1288677 | A2 | 3/2003 |
| EP | 1291673 | A2 | 3/2003 |
| EP | 1291674 | A2 | 3/2003 |
| EP | 1298012 | A2 | 4/2003 |
| EP | 1298453 | A2 | 4/2003 |
| EP | 1298454 | A2 | 4/2003 |
| EP | 1300715 | A2 | 4/2003 |
| EP | 1302784 | A2 | 4/2003 |
| EP | 1304583 | A2 | 4/2003 |
| EP | 1306690 | A2 | 5/2003 |
| EP | 1308747 | A2 | 5/2003 |
| EP | 1355128 | A1 | 10/2003 |
| EP | 1403657 | A1 | 3/2004 |
| EP | 1408318 | A1 | 4/2004 |
| EP | 1418444 | A1 | 5/2004 |
| EP | 1460454 | A2 | 9/2004 |
| EP | 1475764 | A2 | 11/2004 |
| EP | 1515157 | A1 | 3/2005 |
| EP | 1531342 | A1 | 5/2005 |
| EP | 1531343 | A1 | 5/2005 |
| EP | 1548351 | A2 | 6/2005 |
| EP | 1557691 | A1 | 7/2005 |
| EP | 1557692 | A1 | 7/2005 |
| EP | 1557693 | A1 | 7/2005 |
| EP | 1557694 | A1 | 7/2005 |
| EP | 1700763 | A2 | 9/2006 |
| EP | 1914564 | A1 | 4/2008 |
| EP | 1927867 | A1 | 6/2008 |
| EP | 1939652 | A1 | 7/2008 |
| EP | 1947377 | A1 | 7/2008 |
| EP | 1983354 | A1 | 10/2008 |
| EP | 2003471 | A1 | 12/2008 |
| EP | 2177931 | A2 | 4/2010 |
| EP | 2503360 | A1 | 9/2012 |
| GB | 2041687 | A | 9/1980 |
| JP | H3-6407 | | 1/1991 |
| JP | H05240940 | A | 9/1993 |
| JP | H6-288725 | | 10/1994 |
| JP | 11264871 | | 9/1999 |
| JP | 2001216592 | A | 8/2001 |
| JP | 2001-256576 | | 9/2001 |
| JP | 2002-031528 | A | 1/2002 |
| JP | 2003-336447 | A | 11/2003 |
| JP | 2004-348575 | A | 12/2004 |
| JP | 2005-070840 | A | 3/2005 |
| JP | 2005-297863 | | 10/2005 |
| JP | 2006-177843 | | 7/2006 |
| WO | WO-1999/003080 | A1 | 1/1999 |
| WO | WO-2000/025089 | A1 | 5/2000 |
| WO | WO-01/31608 | A1 | 5/2001 |
| WO | WO-03/019234 | A1 | 3/2003 |
| WO | WO-03/040755 | A1 | 5/2003 |
| WO | WO-2004/019293 | A2 | 3/2004 |
| WO | WO-2004/036245 | A2 | 4/2004 |
| WO | WO 2008/008970 | | 1/2008 |
| WO | WO-2009/120706 | A2 | 10/2009 |
| WO | WO-2015/079300 | A1 | 6/2015 |
| WO | WO-2015/104572 | A1 | 7/2015 |
| WO | WO-2016/162568 | A1 | 10/2016 |
| WO | WO-2017/033419 | A1 | 3/2017 |
| WO | WO-2017/089063 | A1 | 6/2017 |
| WO | WO-2017/132703 | A1 | 8/2017 |
| WO | WO-2017/164989 | A1 | 9/2017 |
| WO | WO-2017/165316 | A1 | 9/2017 |
| WO | WO-2017/193269 | A1 | 11/2017 |
| WO | WO-2018/125823 | A1 | 7/2018 |
| WO | WO-2018/196001 | A1 | 11/2018 |

OTHER PUBLICATIONS

Liu, et al., "Coupling Study of a Rotary Capacitive Power Transfer System" Industrial Technology, 2009. ICIT 2009. IEEE International Conference, IEEE, Piscataway, NJ, USA, Feb. 10, 2009. pp. 1-6.

Office of the Federal Register National Archives and Records Administration, "Code of Federal Regulations, 21, Parts 800 to 1299, Revised as of Apr. 1, 2005, Food and Drugs", pp. 1-23, Apr. 1, 2005.

Robert L. Gustavson, "Diode-laser radar for low-cost weapon guidance", SPIE vol. 1633 Laser Radar VII (1992) / 21, pp. 1-12.

Albert V. Jelalian, "Laser Radar Systems", Artech House 1991, pp. 1-3.

Hirohiko Kawata, "Development of ultra-small lightweight optical range sensor system", IEEIRS/RSJ International Conference on Intelligent Robot Systems Aug. 2005, pp. 1-7.

Clifton S. Fox, "Active Electro-Optical Systems", The Infrared and Electro-Optical Systems Handbook, vol. 6, 1993, pp. 1-80.

Merrill I. Skolnik, "Introduction to Radar Systems" Second Edition, McGraw-Hill Book Company, 1980, pp. 1-3.

Westinghouse, "AN/TPS-43 E Tactical Radar System", pp. 1-14.

Besl, "Active, Optical Range Imaging Sensors" Machine Visions and Applications (1988), Springer-Verlag New York Inc., 1:127-152.

Skolnik, "Radar Handbook" Second Edition, McGraw-Hill Publishing Company, 1990, pp. 1-1191.

Saleh, "Fundamentals of Photonics" vol. 1, Wiley-Interscience Publication, 1991 pp. 1-102.

Saleh, "Fundamentals of Photonics" vol. 2, Wiley-Interscience Publication, 1991 pp. 594-695.

The American Heritage Dictionary of the English Language, Houghton Mifflin Company, 1992.

American National Standards Institute, "Procedures for the Development and Coordination of American National Standards", Mar. 22, 1995, pp. 1-50.

Melle, "How to select avalanche photodiodes", Laser Focus World, vol. 31, Issue 10, Oct. 1, 1995, pp. 1-9.

(56) References Cited

OTHER PUBLICATIONS

Ulrich, "Proceedings of SPIE: High-performance 3D-imaging laser sensor" SPIE vol. 3707Part of the EUROPTO Conference on Laser Radar Technology and Applications International, Much, Germany, Jun. 1999, pp. 658-664.
Thomas, "Journal of Laser Applications" Aug. 2001, vol. 13, No. 4, pp. 134-140.
Manandhar, "Auto-Extraction of Urban Features from Vehicle-Borne Laser Data", Centre for Spatial Information Science, The University of Tokyo, Japan; Symposium on Geospatial Theory, Processing Applications, Ottowa 2002.
Aull, "Geiger-Mode Avalanche Photodiodes for Three-Dimensional Imaging", Lincoln Laboratory Journal, vol. 13, No. 2, 2002, pp. 335-350.
The Laser Institute of America, "American National Standard of Safe Use of Lasers" ANSI Z136.1-2000, Revision of ANSI Z136. 1-1993, Second Printing 2003.
Bordone, "Proceedings of SPIE: Development of a high-resolution laser radar for 3D imaging in artwork cataloging" SPIE vol. 5131 (2003), Third GR-1 International Conference on New Laser Technologies and Applications, pp. 244-248.
Yang, "Performance of a large-area avalanche photodiode at low temperature for scintillation detection" Nuclear Instruments and Methods in Physics Research Section A, A 508 (2003) pp. 388-393.
Laser Components Produkte, Laser Components IG, Inc., 2004.
Laser Compontents, "High Power Pulsed Laser Diodes 905D3J08-Series", Laser Components IG, Inc., 2004.
Tarakanov, "Picosecond pulse generation by internal gain switching in laser diodes", Journal of Applied Physics, 95. 223 (2004), American Institute of Physics, pp. 2223-2229.
Richmond, "Polarimetric Imaging Laser Radar (PILAR) Program", 2005, pp. 1-35.
Kawata, "Development of ultra-small lightweight optical range sensor system", 2005 IEEE/RSJ International Conference on Intelligent Robots and Systems, Edmonton, AB, Canada, Aug. 2-6, 2005, pp. 3277-3282.
Information Disclosure Statement filed in U.S. Appl. No. 10/391,383 (now U.S. Pat. No. 7,130,672, Pewzner).
Ogurtsov, High accuracy ranging with Yb3+ -doped fiber-ring frequency-shifted feedback laser with phase-modulated seed; Elsevier B.V., 2006, pp. 266-273.
Information Disclosure Statement filed in U.S. Appl. No. 10/508,232 (now U.S. Pat. No. 7,313,424, Mayevsky).
Ou-Yang, "High-dynamic-range laser range finders based on a novel multimodulated frequency method", Optical Engineering (45(12), 123603 (Dec. 2006), pp. 123603-1-6.
Excelitas Technologies, "Avalance Photodiode. A User Guide", 2011 Excelitas Technologies Corp., pp. 1-8.
Miklos, "Review of Scientific Instruments" vol. 72, No. 4, Apr. 2011, American Institute of Physics, pp. 1-13.
Exhibit 1041 Declaration of Dr. Sylvia Hall-Ellis, filed in IPRP IPR2018-00255 and IPR2018-00256.
Exhibit 1002 Declaration of Dr. James F. Brennan III, filed in IPRP IPR2018-00255 and IPR2018-00256.
Mercotac.com, "Electrical Slip rings—Mercotac Model 305".
Mercotac.com, "Mercotac 3-Conductor Rotary Electrical".
AOOD Technology Limited "Electrical Slip Rings vs. Rotating Electrical Connectors".
Accetta et al., Active Electro-Optical Systems, The Infrared and Electro-Optical Systems Handbook (1993, ed. by Clifton Fox), pp. 3-76. (IPR Nos. '255 and '256 Exhibit 2158).
Acuity Laser, Principles Of Measurement Used By Laser Sensors, https://www.acuitylaser.com/measurement-principles (2018), 4 pages. (IPR Nos. '255 and '256 Exhibit 1075).
Acuity, Acuity Aluminum Billet Scalping Production Information webpage (Brennan Deposition Exhibit 14) (last visited Dec. 28, 2018), 2 pages. (IPR Nos. '255 and '256 Exhibit 2184).
Acuity, Acuity AR700 Laser Displacement Sensor Product Information webpage (Brennan Deposition Exhibit 13) (last visited Dec. 28, 2018), 9 pages. (IPR Nos. '255 and '256 Exhibit 2183).
Acuity, Acuity Drill Pipe Runout Product Information webpage (Brennan Deposition Exhibit 12) (last visited Dec. 28, 2018), 2 pages. (IPR Nos. '255 and '256 Exhibit 2182).
Acuity, Acuity Short Range Sensors Product Information webpage (Brennan Deposition Exhibit 11) (last visited Dec. 30, 2018), 3 pages. (IPR Nos. '255 and '256 Exhibit 2181).
Aiestaran et al. "A Fluorescent Linear Optical Fiber Position Sensor" Elsevier B.V. May 21, 2008 (4 pages).
Albota, "Three-dimensional imaging laser RADAR with a photon-counting avalanche photodiode array and microchip laser," Applied optics, vol. 41, No. 36 (Dec. 20, 2002), 8 pages.
Alhashimi, et al, Statistical Modeling and Calibration of Triangulation Lidars, SCITEPRESS—Science and Technology Publications (2016), pp. 308-317. (IPR Nos. '255 and '256 Exhibit 1069).
Amann, Laser ranging: a critical review of usual techniques for distance measurement, 40(1) Society of Photo-Optical Instrumentation Engineers (Jan. 2001), pp. 10-19. (IPR Nos. '255 and '256 Exhibit 2148).
American National Standard for Safe Use of Lasers, ANSI Z136. 1-2014, Laser Institute of America (Dec. 10, 2013), pp. 27-34 and 216-219. (IPR Nos. '255 and '256 Exhibit 1142).
American National Standard for Safe Use of Lasers, Laser Institute of America (Jun. 28, 2000), 184 pages. (IPR Nos. '255 and '256 Exhibit 2005).
American Petroleum Institute, "Specification for Line Pipe," API Specification 5L, 43rd Ed. (2004), 166 pages. (IPR Nos. '255 and '256 Exhibit 1139).
Aufrere, et al., Perception for collision avoidance and autonomous driving, The Robots Institute, Carnegie Mellon University (2003), 14 pages (IPR Nos. '255 and '256 Exhibit 2140).
Automotive LiDAR, Market Presentation titled "Robotic Cars LiDAR Market in Million Dollars" (Apr. 2018), 86 pages. (IPR Nos. '255 and '256 Exhibit 2113).
Avalanche Photodiode: A User Guide (2011), 8 pages. (IPR Nos. '255 and '256 Exhibit 1019).
Beer, et al, Mechanics of Materials, McGraw Hill Companies, 4th Ed. (2006), pp. 750 and 752. (IPR Nos. '255 and '256 Exhibit 1140).
Berkovic et al., Optical Methods for Distance and Displacement Measurements, Advances in Optics and Photonics (Sep. 11, 2012), pp. 441-471. (IPR Nos. '255 and '256 Exhibit 2007).
Blais, NRC-CNRC, Review of 20 Years of Range Sensor Development, National Research Council Canada (Jan. 2004), pp. 231-243 (IPR Nos. '255 and '256 Exhibit 2141).
Bornstein, "Where am I? Sensors and Methods for Mobile Robot Positioning" (1996), pp. 95-112.
Brennan, Drawing of I-beam by Dr. Brennan (Brennan Deposition Exhibit 16), (Jan. 4, 2019), 1 page. (IPR Nos. '255 and '256 Exhibit 2186).
Brustein et al., How a Billion-Dollar Autonomous Vehicle Startup Lost Its Way, Bloomberg https://www.bloomberg.com/news/features/2018-08-13/how-a-billiondollar-autonomous-vehicle-startup-lost-its-way (Aug. 13, 2018), 7 pages. (IPR Nos. '255 and '256 Exhibit 2098).
Business Wire, Press Release Distribution webpage, https://services.businesswire.com/press-release-distribution (Dec. 21, 2018), 2 pages. (IPR Nos. '255 and '256 Exhibit 1143).
Businesswire, Velodyne Displays Solid State, Highest Performing LiDAR for ADAS, Businesswire https://www.businesswire.com/news/home/20180107005088/en/Velodyne-Displays-Solid-State-Highest-Performing-LiDAR (Jan. 7, 2018), 2 pages. (IPR Nos. '255 and '256 Exhibit 2097).
Businesswire, Velodyne LiDar Awarded "Industry Choice Company of the Year" at TU-Automotive Detroit Conference, Businesswire, https://www.businesswire.com/news/home/20180608005700/en/Velodyne-LiDAR-Awarded-%E2%80%9CIndustry-Choice-Company-Year%E2%80%9D (Jun. 8, 2018), 1 page. (IPR Nos. '255 and '256 Exhibit 2096).
Cameron, An Introduction to LiDAR: The Key Self-Driving Car Sensor, Voyage https://news.voyage.auto/an-introduction-to-lidar-the-key-self-drivingcar-sensor-a7e405590cff (May 9, 2017), 14 pages. (IPR Nos. '255 and '256 Exhibit 2074).
Canadian Patent Office, Office Action, App. No. CA 3,012,003 (dated Aug. 28, 2019), 3 pages.

(56) References Cited

OTHER PUBLICATIONS

Canadian Patent Office, Office Action, App. No. CA 3,017,735 (dated Aug. 28, 2019), 3 pages.
Canadian Patent Office, Office Action, App. No. CA 3,017,811 (dated Aug. 28, 2019), 3 pages.
Canbus, https://web.archive.org/web/20040520021138/ http:/canbus.us:80/ (May 20, 2004), 3 pages. (IPR Nos. '255 and '256 Exhibit 1088).
Carson, N. "Defending GPS against the Spoofing Threat using Network Based Detection and 3,15,20 Successive Interference Cancellation". Auburn University. Nov. 2015, 35 pages.
Chapman, "Introduction to Laser Safety" (Sep. 10, 2007), 19 pages.
Chellapilla, Lidar: The Smartest Sensor on a Self Driving Car, LinkedIn.com https://www.linkedin.com/pulse/lidar-smartest-sensor-self-driving-carkumar-chellapill (Jul. 31, 2017), 8 pages. (IPR Nos. '255 and '256 Exhibit 2075).
Cheung, Spinning laser maker is the real winner of the Urban Challenge, Tech Guru Daily, available at http://www.tgdaily.com/trendwatch-features/34750-spinning-laser-maker-is-the-real-winner (Nov. 7, 2007), 7 pages. (IPR Nos. '255 and '256 Exhibit 2091).
Code of Federal Regulations, Food and Drugs Rule—Performance Standards for Light-Emitting Products, 21 C.F.R. § 1040.10 (2005).
Copper Development Association Inc., Copper Tube Handbook—Industry Standard Guide for the Design and Installation of Copper Piping Systems, CDA Publication A4015-14.17: Copper Tube Handbook (2016), 96 pages. (IPR Nos. '255 and '256 Exhibit 2139).
Cravotta, "Operating alone," EDN (Dec. 5, 2005), 6 pages.
D'Allegro, Meet the Inventor Trying to Bring LiDAR to the Masses, The Drive http://www.thedrive.com/sheetmetal/15567/meet-the-inventor-trying-to bring-lidar-to-the-masses (Oct. 28, 2017), 5 pages. (IPR Nos. '255 and '256 Exhibit 2072).
Daido, Daido Special Steel Co. home page, https://web.archive.org/web/20051227070229/http:/daido.co.jp/ (Dec. 27, 2005), 1 page. (IPR Nos. '255 and '256 Exhibit 1087).
Daido, Daido steel drilling equipment page, https://web.archive.org/web/20050406120958/http:/www.daido.co.jp:80/english/products/applipro/energy/dri.html (Apr. 6, 2005), 1 page. (IPR Nos. '255 and '256 Exhibit 1083).
Daido, Daido steel petroleum components, https://web.archive.org/web/20050406121643/http:/www.daido.co.jp:80/english/products/applipro/energy/petro.htm (Apr. 6, 2005), 1 page. (IPR Nos. '255 and '256 Exhibit 1084).
Daido, Daido steel rebar page, https://web.archive.org/web/20051201010951/http:/www.daido.co.jp:80/products/stainless/ik_shokai.html (Dec. 1, 2005), 2 pages. (IPR Nos. '255 and '256 Exhibit 1086).
DARPA, 2005 DARPA Challenge Info page https://web.archive.org/web/20051214033009/http:/www.darpa.mil:80/grandchallenge/ (Nov. 17, 2005), 1 page. (IPR Nos. '255 and '256 Exhibit 1092).
DARPA, 2005 DARPA Team Papers https://web.archive.org/web/20051213010211/http:/www.darpa.mil:80/grandchallenge/techpapers.html (Dec. 13, 2005), 2 pages. (IPR Nos. '255 and '256 Exhibit 1093).
DARPA, Grand Challenge '05—Frequently Asked Questions, DARPA.com, http://archive.darpa.mil/grandchallenge05/qa.html) (2005), 3 pages. (IPR Nos. '255 and '256 Exhibit 2143).
DARPA, Grand Challenge Media—Frequently Asked Questions (Media),DARPA.com, http://archive.darpa.mil/grandchallenge04/media_faq.htm (2004), 3 pages. (IPR Nos. '255 and '256 Exhibit 2142).
DARPA, PDF found on Team DAD paper URL, https://web.archive.org/web/20051213015642/http:/www.darpa.mil:80/grandchallenge/TechPapers/TeamDAD.pdf (Aug. 6, 2005), pp. 1-12. (IPR Nos. '255 and '256 Exhibit 1094).
DARPA, Urban Challenge, DARPA.com, http://archive.darpa.mil/grandchallenge/ ("DARPA Archive") (2007), 4 pages. (IPR Nos. '255 and '256 Exhibit 2144).
Dehong, et al, Design and Implementation of LiDAR Navigation System Based On Triangulation Measurement, 29th Chinese Control and Decision Conference (CCDC) (May 2017), 59 pages. (IPR Nos. '255 and '256 Exhibit 1136).
Doyle, Velodyne HDL-64E Laser Rangefinder (LIDAR) Pseudo-Disassembled, Hizook (Jan. 4, 2009), 7 pages. (IPR Nos. '255 and '256 Exhibit 2046).
Engineering Toolbox, The Engineering Toolbox Copper Tubes—ASTM B88 Datasheet (last accessed Jul. 10, 2018), 4 pages. (IPR Nos. '255 and '256 Exhibit 2137).
English, et al., The Complementary Nature of triangulation and ladar technologies, 5791 Proceedings of SPIE (May 19, 2005), pp. 29-41. (IPR Nos. '255 and '256 Exhibit 2162).
Esacademy, Betting on CAN, https://web.archive.org/web/20040609170940/http:/www.esacademy.com:80/faq/docs/bettingcan/traditional.htm (Jun. 9, 2004), 1 page. (IPR Nos. '255 and '256 Exhibit 1089).
European Patent Office, Office Action, App. No. EP 07840406.8 (dated Mar. 15, 2011) 7 pages.
European Patent Office, Office Action, App. No. EP 11166432.2 (dated Jan. 29, 2019), 3 pages.
European Patent Office, Office Action, App. No. EP 11166432.2 (dated Oct. 14, 2016), 4 pages.
European Patent Office, Office Action, App. No. EP 11166432.2 (dated Oct. 5, 2015), 4 pages.
European Patent Office, Office Action, App. No. EP 11166432.2 (dated Oct. 7, 2019), 6 pages.
Ewald et al., Object Detection with Laser Scanners for Automotive Applications, IFAC Control in Transportation Systems (2000), pp. 369-372. (IPR Nos. '255 and '256 Exhibit 2191).
Fast Company, The World's 50 Most Innovative Companies 2017, https://www.fastcompany.com/most-innovative-companies/2017 (last visited Feb. 26, 2018), 5 pages. (IPR Nos. '255 and '256 Exhibit 2077).
Fischer, "Rapid Measurement and Mapping of Tracer Gas Concentrations in a Large Indoor Space" (May 2000), 27 pages.
Ford Media Center, Ford Tripling Autonomous Vehicle Development Fleet, Accelerating on-road Testing of Sensors and Software (Jan. 5, 2016), 4 pages. (IPR Nos. '255 and '256 Exhibit 2066).
Frost et al., Driving the Future of Autonomous Navigation—Whitepaper for Analysis of LIDAR technology for advanced safety, https://velodynelidar.com/docs/papers/FROST-ON-LiDAR.pdf (2016), 30 pages. (IPR Nos. '255 and '256 Exhibit 1130).
Fuerstenberg, et al, Multilayer Laserscanner for Robust Object Tracking and Classification in Urban Traffic Scenes, 9th World Congress on Intelligent Transport Systems (2002), 14 pages. (IPR Nos. '255 and '256 Exhibit 1079), pp. 1-10.
Fuerstenberg, et al., Pedestrian Recognition and Tracking of Vehicles using a vehicle based Multilayer Laserscanner, IEEE (2002), 12 pages. (IPR Nos. 255 and '256 Exhibit 2192).
Fuerstenberg, Pedestrian detection and classification by laserscanners, (2003), 8 pages.
Furstenberg, et al., New Sensor for 360 Vehicle Surveillance—Innovative Approach to Stop & Go, Lane Assistance and Pedestrian Recognition (May 2001), 5 pages. (IPR Nos. '255 and '256 Exhibit 2190).
Gargiulo, Velodyne Lidar Tops Winning Urban Challenge Vehicles, Business Wire (Nov. 6, 2007), 2 pages. (IPR Nos. '255 and '256 Exhibit 2082).
Garmin, How the LIDAR-Lite v3/v3HP works with reflective surfaces, GARMIN.com, https://support.garmin.com/en-US/?faq=IVeHYIKwChAY0qCVhQiJ67 (last visited Aug. 24, 2018), 2 pages. (IPR Nos. '255 and '256 Exhibit 2145).
Glennie et al., Temporal Stability of the Velodyne HDL-64E S2 Scanner for High Accuracy Scanning Applications, MDPI Remote Sensing (Mar. 14, 2011), 15 pages. (IPR Nos. '255 and '256 Exhibit 2057).
Glennie, Performance analysis of a kinematic terrestrial LiDAR scanning system, MAPPS/ASPRS 2006 fall conference (Nov. 6-10, 2006), 9 pages.
Glennie, Reign of Point Clouds: A Kinematic Terrestrial LiDAR Scanning System (2007), pp. 22-31.

(56) References Cited

OTHER PUBLICATIONS

Hamamatsu, CCD area image sensor S7030/S7031 Series Back-thinned FFT-CCD Datasheet (2006), 8 pages. (IPR Nos. '255 and '256 Exhibit 2123).
Hamamatsu, CCD Image Sensors Webpage ("CCD Image Sensors") (Feb. 2, 2006), 1 page. (IPR Nos. '255 and '256 Exhibit 2124).
Hamamatsu, Image Sensor Selection guide (Dec. 2003), 20 pages. (IPR Nos. '255 and '256 Exhibit 2128).
Hamamatsu, Image Sensors Webpage (Mar. 17, 2006), 1 page. (IPR Nos. '255 and '256 Exhibit 2160).
Hamamatsu, One-dimensional PSD Plastic package, 1-D PSD with plastic package Datasheet ("1-D PSD Datasheet") (2004), 5 pages. (IPR Nos. '255 and '256 Exhibit 2118).
Hamamatsu, One-Dimensional PSD Webpage, One-dimensional (Mar. 17, 2006), 1 page. (IPR Nos. '255 and '256 Exhibit 2119).
Hamamatsu, Photodiode Technical Information, 18 pages. (IPR Nos. '255 and '256 Exhibit 2129).
Hamamatsu, Position Sensitive Detectors ("PSDs") Webpage, One-dimensional and Two-dimensional (Mar. 17, 2006), 1 page. (IPR Nos. '255 and '256 Exhibit 2117).
Hamamatsu, S4111-46Q Si Photodiode Array Webpage (Oct. 22, 2005), 1 page. (IPR Nos. '255 and '256 Exhibit 2135).
Hamamatsu, Si photodiode array—S4111/S4114 series 16, 35, 46 element Si photodiode array for UV to NIR Datasheet (Jul. 2004), 4 pages. (IPR Nos. '255 and '256 Exhibit 2134).
Hamamatsu, Silicon Photodiode Array Webpage (Feb. 2, 2006), 1 page. (IPR Nos. '255 and '256 Exhibit 2130).
Hamamatsu, Technical Information, SD-25—Characteristics and use of FFT-CCD area image sensor (Aug. 2003), 27 pages. (IPR Nos. '255 and '256 Exhibit 2126).
Hamamatsu, Technical Information, SD-28—Characteristics and use of Si APD (Avalanche Photodiode) (Aug. 2001), 12 pages. (IPR Nos. '255 and '256 Exhibit 2127).
Hamamatsu, Two-dimensional PSD S1300 Datasheet (Dec. 19, 2005), 1 page. (IPR Nos. '255 and '256 Exhibit 2121).
Hamamatsu, Two-dimensional PSDs S1200, S1300, S1880, S1881, S2044—Non-discrete position sensor utilizing photodiode surface resistance Datasheet (2003), 6 pages. (IPR Nos. '255 and '256 Exhibit 2120).
Hamamatsu, Two-dimensional PSDs Webpage (Mar. 17, 2006), 1 page. (IPR Nos. '255 and '256 Exhibit 2122).
Hamatsu, Opto-Semiconductor Handbook, Si APD, MMPC (Chapter 3), ("APD Handbook"), available at https://www.hamamatsu.com/us/en/hamamatsu/overview/bsd/solid_state_division/related_documents.html (2014), 25 pages. (IPR Nos. '255 and '256 Exhibit 2006).
Hancock, "Laser Intensity Based Obstacle Detecting and Tracking" (Jan. 1999), pp. 45-65.
Haran et al., Infrared Reflectivy of Pedestrian Mannequin for Autonomous Emergency Braking Testing, IEEE 19th International Conference on Intelligent Transportation Systems (ITSC) (2016), 6 pages. (IPR Nos. '255 and '256 Exhibit 2168).
Heenan, et al., Feature-Level Map Building and Object Recognition for Intersection Safety Applications, in Advanced Microsystems for Automotive Applications (Jurgen Valldorf and Wolfgang Gessner eds.) (2005), pp. 505-519. (IPR Nos. '255 and '256 Exhibit 2199).
Hergert et al., The WITS$ guide to selecting a photodetector, Hamamatsu.com, https://hub.hamamatsu.com/us/en/technical-note/WITS-guide-detectorselection/index.html (Jul. 2015), 16 pages. (IPR Nos. '255 and '256 Exhibit 2133).
IBEO, "IBEO about," https://web.archive.org/web/20040606111631/http:/www.ibeoas.de:80/html/about/about (2004).
IBEO, "IBEO data and prices," https://web.archive.org/web/20041209025137/http://www.ibeoas.de:80/html/prod/prod_dataprices.html (2004), 2 pages.
IBEO, "IBEO history," https://web.archive.org/web/20040807161657/,http:/www.ibeoas.de:80/html/about/ab_history.html (2004), 1 page.
IBEO, "IBEO LD Multilayer data sheet," https://web.archive.org/web/20031003201743/http://www.ibeoas.de:80/html/prod/prod_ld_multi.html (2003), 1 page.
IBEO, "IBEO Motiv sensor," https://web.archive.org/web/20040113062910/,http://www.ibeoas.de:80/html/rd/rd_rs_motiv.htm (1997-2000), 1 page.
IBEO, "IBEO multilayer tech" (2004), 1 page.
IBEO, "IBEO multitarget capability," https://web.archive.org/web/20040323030746/,http/:www.ibeoas.de:80/html/knho/knho-senstech-mlc.html (2004), 1 page.
IBEO, "IBEO products," https://web.archive.org/web/20040606115118/http/:www.ibeoas.de:80/html/prod/prod.html (2004), 1 page.
IBEO, "IBEO products," https://web.archive.org/web/20041011011528/http://www.ibeoas.de:80/html/prod/prod.html (2004), 1 page.
IBEO, "IBEO publications," https://web.archive.org/web/20031208175052/http://www.ibeoas.de:80/html/public/public.html (2003), 2 pages.
IBEO, "IBEO roadmap," https://web.archive.org/web/20041209032449/http:/www.ibeoas.de:80/html/prod/prod_roadmap.html (2004), 1 page.
IBEO, "IBEO Time of Flight" (2004), 1 page.
IBEO, "IBEO," https://web.archive.org/web/20040202131331/http:/www.ibeo-as.de:8 (2004), 1 page.
IBEO, IBEO about page, https://web.archive.org/web/20040606111631/http:/www.ibeoas.de:80/html/about/about (Jun. 6, 2004), 1 page. (IPR Nos. '255 and '256 Exhibit 1103).
IBEO, IBEO Alasca, https://web.archive.org/web/20031001091407/http:/www.ibeoas.de:80/html/prod/prod_alasca.html (Oct. 1, 2003), 1 page. (IPR Nos. '255 and '256 Exhibit 1099).
IBEO, IBEO Automobile Sensor GmbH—Scanner Technology webpage (Brennan Deposition Exhibit 1) (Mar. 23, 2004), 1 page. (IPR Nos. '255 and '256 Exhibit 2171).
IBEO, IBEO Automobile Sensor GmbH—The ALASCA project webpage (Brennan Deposition Exhibit 2) (Oct. 6, 2003), 1 page. (IPR Nos. '255 and '256 Exhibit 2172).
IBEO, IBEO Available products, https://web.archive.org/web/20041011011528/http://www.ibeoas.de:80/html/prod/prod.html (Oct. 11, 2004), 1 page. (IPR Nos. '255 and '256 Exhibit 1108).
IBEO, IBEO data sheet re available products, https://web.archive.org/web/20041209025137/http://www.ibeoas.de:80/html/prod/prod_dataprices.html (Dec. 9, 2004), 2 pages. (IPR Nos. '255 and '256 Exhibit 1107).
IBEO, IBEO history, https://web.archive.org/web/20040807161657/http:/www.ibeoas.de:80/html/about/ab_history.html (Aug. 7, 2004), 1 page. (IPR Nos. '255 and '256 Exhibit 1104).
IBEO, IBEO home page, https://web.archive.org/web/20040202131331/http:/www.ibeo-as.de:8 (Feb. 2, 2004), 1 page. (IPR Nos. '255 and '256 Exhibit 1102).
IBEO, IBEO LD Multilayer data sheet, https://web.archive.org/web/20031003201743/http://www.ibeoas.de:80/html/prod/prod_ld_multi.html (Oct. 3, 2003), 1 page. (IPR Nos. '255 and '256 Exhibit 1111).
IBEO, IBEO Motiv sensor, https://web.archive.org/web/20040113062910/http://www.ibeoas.de:80/html/rd/rd_rs_motiv.htm (Jan. 13, 2004), 1 page. (IPR Nos. '255 and '256 Exhibit 1110).
IBEO, IBEO multilayer tech, (Jan. 8, 2004), 1 page. (IPR Nos. '255 and '256 Exhibit 1097).
IBEO, IBEO multilayer technology page with moving graphic, Archive.org (Jan. 8, 2004), 1 page. (IPR Nos. '255 and '256 Exhibit 1096).
IBEO, IBEO multitarget capability, https://web.archive.org/web/20040323030746/http:/www.ibeoas.de:80/html/knho/knho_senstech_mlc.html (Mar. 23, 2004), 1 page. (IPR Nos. '255 and '256 Exhibit 1101).
IBEO, IBEO products page, https://web.archive.org/web/20040606115118/http:/www.ibeoas.de:80/html/prod/prod.html (Jun. 6, 2004), 1 page. (IPR Nos. '255 and '256 Exhibit 1100).
IBEO, IBEO publications page, https://web.archive.org/web/20031208175052/http://www.ibeoas.de:80/html/public/public.html (Dec. 8, 2003), 2 pages. (IPR Nos. '255 and '256 Exhibit 1109).
IBEO, IBEO Roadmap, https://web.archive.org/web/20041209032449/http:/www.ibeoas.de:80/html/prod/prod_roadmap.html (Dec. 9, 2004), 1 page. (IPR Nos. '255 and '256 Exhibit 1105).
IBEO, IBEO time of flight with moving graphic, (Jan. 8, 2004), 1 page. (IPR Nos. '255 and '256 Exhibit 1095).
IBEO, IBEO Time of Flight, (Jan. 8, 2004), 1 page. (IPR Nos. '255 and '256 Exhibit 1098).

(56) References Cited

OTHER PUBLICATIONS

Informed Infrastructure, Velodyne LiDAR Division Announces Agreement with Caterpillar for Laser Imaging Technology, Informed Infrastructure http://informedinfrastructure.com/25630/velodynes-lidar-divisionannounces-agreement-with-caterpillar-for-laser-imaging-technology-2/ (Aug. 8, 2012), 3 pages. (IPR Nos. '255 and '256 Exhibit 2079).
Inter Parties Review Decision Denying Petitioner's Request for Rehearing (May 21, 2020), 26 pages. (IPR No. 2018-00255).
Inter Parties Review Decision: Institution of Inter Partes Review (May 25, 2018), 11 pages. (IPR No. 2018-00255).
Inter Parties Review Decision: Petitioner's Motion to Submit Supplemental Information Pursuant to 37 C.F.R. § 42.123(b) (Aug. 8, 2018), 4 pages. (IPR No. 2018-00255).
Inter Parties Review Final Written Decision (May 23, 2019), 40 pages. (IPR No. 2018-00255).
Inter Parties Review Patent Owner's Contingent Motion to Amend (Public Version—Redacted) (Sep. 28, 2018), 56 pages. (IPR No. 2018-00255).
Inter Parties Review Patent Owner's Preliminary Response (Public Version—Redacted) (Mar. 7, 2018), 72 pages. (IPR No. 2018-00255).
Inter Parties Review Patent Owner's Reply in Support of Its Contingent Motion to Amend (Jan. 16, 2019), 33 pages. (IPR No. 2018-00255).
Inter Parties Review Patent Owner's Response (Public Version—Redacted) (Sep. 28, 2018), 92 pages. (IPR No. 2018-00255).
Inter Parties Review Patent Owner's Surreply (Jan. 16, 2019), 50 pages. (IPR No. 2018-00255).
Inter Parties Review Patent Owner's Updated Exhibit List (Feb. 11, 2019), 21 pages. (IPR No. 2018-00255).
Inter Parties Review Petition for Inter Partes Review of U.S. Pat. No. 7,969,558 (Claims 1-4, 8, and 9) (IPR No. 2018-00255, *Quanergy Systems, Inc.* v. *Velodyne Lidar, Inc.*) (Nov. 29, 2017), 67 pages. (IPR No. 2018-00255).
Inter Parties Review Petitioner Quanergy's Opposition to Patent Owner's Contingent Motion to Amend (Dec. 21, 2018), 35 pages. (IPR No. 2018-00255).
Inter Parties Review Petitioner Quanergy's Sur-Surreply (Jan. 30, 2019), 9 pages. (IPR No. 2018-00255).
Inter Parties Review Petitioner Quanergy's Surreply to Patent Owner's Contingent Motion to Amend (Jan. 30, 2019), 17 pages. (IPR No. 2018-00255).
Inter Parties Review Petitioner's Motion to Submit Supplemental Information Pursuant to 37 C.F.R. § 42.123(b) (Aug. 6, 2018), 16 pages. (IPR No. 2018-00255).
Inter Parties Review Petitioner's Reply to Patent Owner's Response (Dec. 21, 2018), 38 pages. (IPR No. 2018-00255).
Inter Parties Review Petitioner's Request for Rehearing (Jun. 24, 2019), 20 pages. (IPR No. 2018-00255).
Inter Parties Review Petitioner's Unopposed Motion to Submit Replacement Petition and Supplemental Declaration (Nov. 5, 2018), 9 pages. (IPR No. 2018-00255).
Inter Parties Review Petitioner's Updated Exhibit List (Jan. 30, 2019), 13 pages. (IPR No. 2018-00255).
Inter Parties Review Record of Oral Hearing (Feb. 27, 2019), 126 pages. (IPR Nos. 2018-00255 and 2018-00256).
Inter Parties Review Replacement Petition for Inter Partes Review of U.S. Pat. No. 7,969,558 (Claims 1-4, 8, and 9), 71 pages. (IPR No. 2018-00255).
Inter Parties Review, Chris Butler Affidavit and Exhibit (Dec. 18, 2018), 33 pages. (IPR Nos. '255 and '256 Exhibit 1066).
Inter Parties Review, Chris Butler Affidavit and Exhibit (Dec. 20, 2018), 52 pages. (IPR Nos. '255 and '256 Exhibit 1067).
Inter Parties Review, Decision Denying Petitioner's Request for Rehearing (May 21, 2020), 26 pages. (IPR No. 2018-00256).
Inter Parties Review, Decision: Institution of Inter Partes Review (May 25, 2018), 12 pages. (IPR No. 2018-00256).
Inter Parties Review, Decision: Petitioner's Motion to Submit Supplemental Information Pursuant to 37 C.F.R. § 42.123(b) (Aug. 8, 2018), 4 pages. (IPR No. 2018-00256).
Inter Parties Review, Declaration of J. Gary Eden, Ph.D. in Support of Patent Owner's Preliminary Responses (Public Version—Redacted) (Mar. 7, 2018), 120 pages. (IPR Nos. '255 and '256 Exhibit 2003).
Inter Parties Review, Declaration of J. Gary Eden, Ph.D. in Support of Patent Owner's Reply in Support of Its Motion to Amend (Jan. 16, 2019), 71 pages. (IPR Nos. '255 and '256 Exhibit 2202).
Inter Parties Review, Declaration of J. Gary Eden, Ph.D. in Support of Patent Owner's Responses and Motions to Amend (Public Version—Redacted) (Sep. 27, 2018), 202 pages. (IPR Nos. '255 and '256 Exhibit 2115).
Inter Parties Review, Declaration of James F. Brennan, III in Support of Petitioner's Replies and Oppositions to Motions to Amend (Dec. 21, 2018), 93 pages. (IPR Nos. '255 and '256 Exhibit 1063).
Inter Parties Review, Declaration of Sylvia Hall-Ellis (Dec. 21, 2018), 146 pages. (IPR Nos. '255 and '256 Exhibit 1065).
Inter Parties Review, Defendant Velodyne's Answer and Counterclaim, *Quanergy Systems, Inc.*, v. *Velodyne Lidar, Inc.*, No. 5:16-cv-05251-EJD (N.D. Cal.) ECF No. 36 (Dec. 5, 2016), 56 pages. (IPR Nos. '255 and '256 Exhibit 2080).
Inter Parties Review, Deposition of James F. Brennan, III, *Quanergy Systems, Inc.* v. *Velodyne Lidar, Inc.*, Nos. IPR2018-00255 and IPR2018-00256 (Aug. 23, 2018), 241 pages. (IPR Nos. '255 and '256 Exhibit 2156).
Inter Parties Review, Deposition of James F. Brennan, III, *Quanergy Systems, Inc.* v. *Velodyne Lidar, Inc.*, Nos. IPR2018-00255 and IPR2018-00256 (Jan. 4, 2019), 267 pages. (IPR Nos. '255 and '256 Exhibit 2194).
Inter Parties Review, Deposition Transcript of J. Gary Eden, Ph.D (taken Nov. 27, 2018), 285 pages. (IPR Nos. '255 and '256 Exhibit 1064).
Inter Parties Review, Deposition Transcript of J. Gary Eden, Ph.D (taken on Jan. 22, 2019), 368 pages. (IPR Nos. '255 and '256 Exhibit 1150).
Inter Parties Review, Eden Deposition Exhibit 1—Unmanned Vehicles Come of Age: The DARPA Grand Challenge (2006), pp. 26-29. (IPR Nos. '255 and '256 Exhibit 1151).
Inter Parties Review, Eden Deposition Exhibit 10—Are processor algorithms key to safe self-driving cars?—EDN Asia (https: //www.ednasia.com/ news /article/areprocessor-algorithms-key-to-safe-self-driving-cars) (Jul. 7, 2016), 7 pages. (IPR Nos. '255 and '256 Exhibit 1160).
Inter Parties Review, Eden Deposition Exhibit 11—Steve Taranovich's profile (https://www.edn.com/user/steve.taranovich) (Jan. 22, 2019), 4 pages. (IPR Nos. '255 and '256 Exhibit 1161).
Inter Parties Review, Eden Deposition Exhibit 12—Instrumentation and Control (http://www.Instrumentation.co.za /article.aspx?pklarticleid=1664) (Feb. 2002), 4 pages. (IPR Nos. '255 and '256 Exhibit 1162).
Inter Parties Review, Eden Deposition Exhibit 13—IBEO on board: ibeo LUX 4L / ibeo LUX 8L / ibeo LUX HD Data Sheet (Jul. 2017), 2 pages. (IPR Nos. '255 and '256 Exhibit 1163).
Inter Parties Review, Eden Deposition Exhibit 2—Driver Reaction Time in Crash Avoidance Research: validation of a Driving Simulator Study on a Test Track; Article in Human Factors and Ergonomics Society Annual Meeting Proceedings, Jul. 2000, 5 pages. (IPR Nos. '255 and '256 Exhibit 1152).
Inter Parties Review, Eden Deposition Exhibit 3—Axis of Rotation diagram (Jan. 22, 2019), 1 page. (IPR Nos. '255 and '256 Exhibit 1153).
Inter Parties Review, Eden Deposition Exhibit 4—Parallel Line and Plane—from Wolfram MathWorld (http://mathworld.wolfram.com/ParallelLineandPlane.html) (Jan. 22, 2019), 1 page. (IPR Nos. '255 and '256 Exhibit 1154).
Inter Parties Review, Eden Deposition Exhibit 5—Quasi-3D Scanning with Laserscanners: Introduction from 2D to 3D (2001), 7 pages. (IPR Nos. '255 and '256 Exhibit 1155).

(56) References Cited

OTHER PUBLICATIONS

Inter Parties Review, Eden Deposition Exhibit 6—L-Gage LT3 Long-Range Time-of-Flight Laser Distance-Gauging Sensors (2002), 12 pages. (IPR Nos. '255 and '256 Exhibit 1156).
Inter Parties Review, Eden Deposition Exhibit 7—About Ibeo: Our Mission (https://www.ibeoas.com/aboutibeo) (Jan. 21, 2019), 10 pages. (IPR Nos. '255 and '256 Exhibit 1157).
Inter Parties Review, Eden Deposition Exhibit 8—Automotive Industry; Explore Our Key Industries (https://velodynelidar.com/industry.html) (2019), 6 pages. (IPR Nos. '255 and '256 Exhibit 1158).
Inter Parties Review, Eden Deposition Exhibit 9—Leddar Tech, Solid-State LiDARs: Enabling the Automotive Industry Towards Autonomous Driving (2018), 6 pages. (IPR Nos. '255 and '256 Exhibit 1159).
Inter Parties Review, Excerpt from Beautiful Data, Edited by Toby Segaran and Jeff Hammerbacher (Jul. 2009), pp. 150-153. (IPR Nos. '255 and '256 Exhibit 2014).
Inter Parties Review, Excerpt from James T. Luxon and David E. Parker, Industrial Lasers and Their Applications, Prentice-Hall (1985), pp. 56, 68-70, 124-125, 145, 150-151, and 154-159. (IPR Nos. '255 and '256 Exhibit 2009).
Inter Parties Review, Excerpt from Peter W. Milonni and Joseph Eberly, Lasers (1988), pp. 585-589. (IPR Nos. '255 and '256 Exhibit 2011).
Inter Parties Review, Excerpt from Raymond T. Measures, Laser Remote Sensing, Fundamentals and Applications (1992), pp. 205 and 213-214. (IPR Nos. '255 and '256 Exhibit 2010).
Inter Parties Review, Excerpt from Stephan Lugomer, Laser Technology, Laser Driven Processes, Prentice-Hall (1990), pp. 302-311. (IPR Nos. '255 and '256 Exhibit 2008).
Inter Parties Review, Excerpt from William V. Smith, Laser Applications (1970), pp. 23-27. (IPR Nos. '255 and '256 Exhibit 2012).
Inter Parties Review, Excerpts of Deposition of Craig L. Glennie, Ph.D., *Quanergy Systems, Inc.,* v. *Velodyne Lidar, Inc.,* No. 5:16-cv-05251-EJD (N.D. Cal.) (Jun. 27, 2017), 6 pages. (IPR Nos. '255 and '256 Exhibit 2016).
Inter Parties Review, Final Written Decision (May 23, 2019), 41 pages. (IPR No. 2018-00256).
Inter Parties Review, Images of Generator Rotors (Brennan Deposition Exhibit 8) (2018), 2 pages. (IPR Nos. '255 and '256 Exhibit 2178).
Inter Parties Review, Listing of Labelled Substitute Claims (2018), 17 pages. (IPR Nos. '255 and '256 Exhibit 1076).
Inter Parties Review, Patent Owner's Contingent Motion to Amend (Public Version—Redacted) (Sep. 28, 2018), 57 pages. (IPR No. 2018-00256).
Inter Parties Review, Patent Owner's Preliminary Response (Public Version—Redacted) (Mar. 7, 2018), 73 pages. (IPR No. 2018-00256).
Inter Parties Review, Patent Owner's Reply in Support of Its Contingent Motion to Amend (Jan. 16, 2019), 33 pages. (IPR No. 2018-00256).
Inter Parties Review, Patent Owner's Response (Public Version—Redacted) (Sep. 28, 2018), 92 pages. (IPR No. 2018-00256).
Inter Parties Review, Patent Owner's Surreply (Jan. 16, 2019), 50 pages. (IPR No. 2018-00256).
Inter Parties Review, Patent Owner's Updated Exhibit List (Feb. 11, 2019), 20 pages. (IPR No. 2018-00256).
Inter Parties Review, Petition for Inter Partes Review of U.S. Pat. No. 7,969,558 (Claims 16-19 and 23-25) (IPR No. 2018-00256, *Quanergy Systems, Inc.* v. *Velodyne Lidar, Inc.*) (Nov. 29, 2017), 73 pages. (IPR No. 2018-00256).
Inter Parties Review, Petitioner Quanergy's Opposition to Patent Owner's Contingent Motion to Amend (Dec. 21, 2018), 35 pages. (IPR No. 2018-00256).
Inter Parties Review, Petitioner Quanergy's Sur-Surreply (Jan. 30, 2019), 9 pages. (IPR No. 2018-00256).
Inter Parties Review, Petitioner Quanergy's Surreply to Patent Owner's Contingent Motion to Amend (Jan. 30, 2019), 17 pages. (IPR No. 2018-00256).
Inter Parties Review, Petitioner's Motion to Submit Supplemental Information Pursuant to 37 C.F.R. § 42.123(b) (Aug. 6, 2018), 16 pages. (IPR No. 2018-00256).
Inter Parties Review, Petitioner's Reply to Patent Owner's Response (Dec. 21, 2018), 37 pages. (IPR No. 2018-00256).
Inter Parties Review, Petitioner's Request for Rehearing (Jun. 24, 2019), 20 pages. (IPR No. 2018-00256).
Inter Parties Review, Petitioner's Unopposed Motion to Submit Replacement Petition and Supplemental Declaration (Nov. 5, 2018), 9 pages. (IPR No. 2018-00256).
Inter Parties Review, Petitioner's Updated Exhibit List (Jan. 30, 2019), 15 pages. (IPR No. 2018-00256).
Inter Parties Review, PTAB Conference Call, *Quanergy Systems, Inc.* v. *Velodyne Lidar, Inc.,* Nos. IPR2018-00255 and 2018-00256 (Jan. 11, 2019), 27 pages. (IPR Nos. '255 and '256 Exhibit 2204).
Inter Parties Review, Quanergy Invalidity Contentions Claim Chart, U.S. Pat. No. 7,969,558 (Mizuno), *Quanergy Systems, Inc.* v. *Velodyne LiDAR, Inc.,* Case No. 5:16-cv-5251-EJD (Mar. 27, 2017), 17 pages. (IPR Nos. '255 and '256 Exhibit 1127).
Inter Parties Review, Quanergy Invalidity Contentions Claim Chart, U.S. Pat. No. 7,969,558 (Pilar), *Quanergy Systems, Inc.* v. *Velodyne LiDAR, Inc.,* Case No. 5:16-cv-5251-EJD (Mar. 27, 2017), 13 pages. (IPR Nos. '255 and '256 Exhibit 1128).
Inter Parties Review, Quanergy M8 Lidar Sensor Datasheet, 2 pages. (IPT Nos. '255 and '256 Exhibit 2071).
Inter Parties Review, Quanergy Systems Inc.'s Invalidity Contentions and Production of Documents Pursuant to Patent Local Rules 3-3 and 3-4, *Quanergy Systems, Inc.* v. *Velodyne LiDAR, Inc.,* Case No. 5:16-cv-5251-EJD (Mar. 27, 2017), 24 pages. (IPR Nos. '255 and '256 Exhibit 1126).
Inter Parties Review, Quanergy's Objected-to Demonstrative Slides of Patent Owner (2019), 16 pages. (IPR Nos. '255 and '256 Exhibit 1164).
Inter Parties Review, Redlined Supplemental Declaration of Dr. James F. Brennan III (2018), 171 pages. (IPR Nos. '255 and '256 Exhibit 1062).
Inter Parties Review, Replacement Petition for Inter Partes Review of U.S. Pat. No. 7,969,558 (Claims 16-19 and 23-25) (2018) 76 pages. (IPR No. 2018-00256).
Inter Parties Review, Transcript of Sep. 13, 2018 Conference Call, *Quanergy Systems, Inc.* v. *Velodyne Lidar, Inc.,* Nos. IPR2018-00255 and IPR2018-00256 (Sep. 13, 2018), 21 pages. (IPR Nos. '255 and '256 Exhibit 2116).
International Electrotechnical Commission, "Safety of laser products—part 1: equipment classification and requirements," International Standard IEC 60825-1, edition 1.2 (Aug. 2001), 122 pages.
International Electrotechnical Commission, "Safety of laser products—part 1: equipment classification and requirements," International Standard IEC 60825-1, edition 2.0 (2007), 104 pages.
Internet Archive Web Page: Laser Components (2004), 1 page. (IPR Nos. '255 and '256 Exhibit 1023).
Internet Archive Web Page: Laser Components: High Powered Pulsed Laser Diodes 905D3J08-Series (2004), 6 pages. (IPR Nos. '255 and '256 Exhibit 1024).
IPO Education Foundation, Inventor of the Year Award, https://www.ipoef.org/inventor-of-the-year/ (2018), 5 pages. (IPR Nos. '255 and '256 Exhibit 2207).
irdajp.org, IrDA Infrared Data Association, http://www.irdajp.org/irdajp.info (2018), 3 pages. (IPR Nos. '255 and '256 Exhibit 1134).
Janocha, Actuators: Basics and Applications, Springer (2004), pp. 85-153. (IPR Nos. '255 and '256 Exhibit 1080).
Japanese Patent Office, Petitioner's Translation of Mizuno Japanese Patent Publication No. H3-6407 (1991), 15 pages. (IPR Nos. '255 and '256 Exhibit 1058).
Kaempchen, Feature-Level Fusion of Laser Scanner and Video Data for Advanced Drive Assistance Systems (Ph.D. Dissertation, Ulm University) (2007), 248 pages. (IPR Nos. '255 and '256 Exhibit 2198).
Kaufmann, Choosing Your Detector, OE Magazine (Mar. 2005), 3 pages. (IPR Nos. '255 and '256 Exhibit 2150).

(56) References Cited

OTHER PUBLICATIONS

Kaufmann, Light Levels and Noise—Guide Detector Choices, Photonics Spectra 149 (Jul. 2000), 4 pages. (IPR Nos. '255 and '256 Exhibit 2151).
Kilpela, Excerpt of Pulsed Time-of-Flight Laser Range Finder Techniques for Fast, High Precision Measurement Applications, at Fig. 24 (Academic dissertation, University of Oulu (Brennan Deposition Exhibit 15) (2004), 1 page. (IPR Nos. '255 and '256 Exhibit 2185).
Kilpela, Pulsed Time-of-Flight Laser Range Finder Techniques for Fast, High Precision Measurement Applications (Academic dissertation, University of Oulu) (2004), 98 pages. (IPR Nos. '255 and '256 Exhibit 2152).
Kluge, Laserscanner for Automotive Applications (May 2001), 5 pages. (IPR Nos. '255 and '256 Exhibit 2196).
Kohanbash, "LIDAR fundamentals—robots for roboticists" (May 5, 2014), 6 pages.
Lages, Laserscanner for Obstacle Detection in Advanced Microsystems for Automotive Applications Yearbook (S. Kruger et al. eds.) (2002), pp. 136-140. (IPR Nos. '255 and '256 Exhibit 2200).
Lamon, "The SmarTer for ELROB 2006—a vehicle for fully autonomous navigation and mapping in outdoor environments" (2005), 14 pages.
Langheim, et al., Sensing of Car Environment at Low Speed Driving, Carsense (2002), 14 pages. (IPR Nos. '255 and '256 Exhibit 2193).
Laser Components, https:/web.archive.org/web/20041205172904/http:www.lasercomponents.com (2004), 1 page. (IPR Nos. '255 and '256 Exhibit 1023).
Maatta et al., A High-Precision Time-to-Digital Converter for Pulsed Time-of-Flight Laser Radar Applications, 47 IEEE No. 2, 521 (Apr. 1998), pp. 521-536. (IPR Nos. '255 and '256 Exhibit 2161).
MacAdam, Understanding and Modeling the Human Driver, 40 Vehicle System Dynamics, Nos. 1-3 (2003), pp. 101-134. (IPR Nos. '255 and '256 Exhibit 2205).
Makynen, Position-Sensitive Devices and Sensor System for Optical Tracking and Displacement Sensing Applications (Academic Dissertation, University of Oulu (2000), 121 pages. (IPR Nos. '255 and '256 Exhibit 2153).
Marino, "A compact 3D imaging laser RADAR system using Geiger-mode APD arrays: system and measurements," Proceedings of SPIE—The international society for optical engineering (Aug. 2003), 16 pages.
Marino, "Jigsaw: A Foliage-Penetrating 3D Imaging Laser Radar System" (2005), pp. 23-36.
McManamon, "Optical Phased Array Technology," Proceedings of the IEEE, vol. 84, No. 2 (Feb. 1996), pp. 268-298.
Mercotac, 3-Conductor Rotary Electrical Connectors https://web.archive.org/web/20060317120209/http://www.mercotac.com:80/html/threeconductor.html (Mar. 2006), 1 page.
Merriam, How to Use Lidar with the raspberry PI, Hackaday, https://hackaday.com/2016/01/22/how-to-use-lidar-with-the-raspberry-pi/ (Jan. 22, 2016), 13 pages. (IPR Nos. '255 and '256 Exhibit 1072).
Morsy et al., "Multispectral LiDAR Data for Land Cover Classification of Urban Areas," Sensors 17(5), 958 (2017), 21 pages.
MTI Instruments Inc., An Introduction to Laser Triangulation Sensors, https://www.azosensors.com/article.aspx?ArticleID=523 (Aug. 28, 2014), 9 pages. (IPR Nos. '255 and '256 Exhibit 2154).
Nagappan, "Adaptive Cruise Control: Laser Diodes as an Alternative to Millimeter Wave Radars" (Sep. 2005), pp. 1-5.
National Highway Traffic Safety Administration (NHTSA), DOT, Final Rule Federal Motor Vehicle Safety Standards; Tire Pressure Monitoring Systems Controls and Displays (2005), 222 pages. (IPR Nos. '255 and '256 Exhibit 1141).
Ohnsman, How A 34-Year-Old Audio Equipment Company is Leading the Self-Driving Car Revolution, Forbes (Aug. 8, 2017), 7 pages. (IPR Nos. '255 and '256 Exhibit 2040).
Ohr, "War raises stakes of next DARPA bot race," EDN (Aug. 15, 2005), 3 pages.
Omron, Technical Explanation for Displacement Sensors and Measurement Sensors, CSM_Displacemente_LineWidth_TG_E_2_1 (2018), 8 pages. (IPR Nos. '255 and '256 Exhibit 2149).
Oshkosh, "Team Terramax: DARPA Grand Challenge 2005" (Oct. 2005), pp. 1-14.
Overton, First Sensor expands supply agreement for APDs used in Velodyne lidar systems, Laser Focus World (Feb. 15, 2017), 2 pages. (IPR Nos. '255 and '256 Exhibit 2039).
Ozguner, "Team TerraMax and the DARPA Grand Challenge: a General Overview," IEEE Intelligent Vehicles Symposium (2004), 6 pages.
Panasonic, Measurement Sensors: Specular vs Diffuse, Panasonic Blog, https://na.industrial.panasonic.com/blog/measurement-sensorsspecular-vs-diffuse (Dec. 7, 2011), 2 pages. (IPR Nos. '255 and '256 Exhibit 2155).
PCT International Search Report and Written Opinion, App. No. PCT/US2007/073490, (dated 2008), 10 pages.
PCT International Search Report and Written Opinion, App. No. PCT/US2010/037129, dated Jul. 27, 2010, 6 pages.
PCT International Search Report and Written Opinion, App. No. PCT/US2017/015869, dated Apr. 10, 2017, 12 pages.
PCT International Search Report and Written Opinion, App. No. PCT/US2017/015874, dated May 23, 2017, 12 pages.
PCT International Search Report and Written Opinion, App. No. PCT/US2017/015877, dated Apr. 13, 2017, 13 pages.
PCT International Search Report and Written Opinion, App. No. PCT/US2017/023259, dated May 31, 2017, 10 pages.
PCT International Search Report and Written Opinion, App. No. PCT/US2017/023261, dated May 26, 2017, 11 pages.
PCT International Search Report and Written Opinion, App. No. PCT/US2017/023262, dated Jun. 5, 2017, 9 pages.
PCT International Search Report and Written Opinion, App. No. PCT/US2017/035427, dated Aug. 29, 2017, 10 pages.
PCT International Search Report and Written Opinion, App. No. PCT/US2017/036865, dated Sep. 26, 2017, 10 pages.
PCT International Search Report and Written Opinion, App. No. PCT/US2017/047543, dated Nov. 27, 2017, 11 pages.
PCT International Search Report and Written Opinion, App. No. PCT/US2018/023283, dated Jun. 1, 2018. 9 pages.
PCT International Search Report and Written Opinion, App. No. PCT/US2018/025395, dated Jun. 25, 2018, 14 pages.
PCT International Search Report and Written Opinion, App. No. PCT/US2018/031682, dated Sep. 17, 2018, 12 pages.
PCT International Search Report and Written Opinion, App. No. PCT/US2018/050934, dated Nov. 20, 2018, 10 pages.
PCT International Search Report and Written Opinion, App. No. PCT/US2018/051497, dated Nov. 28, 2018, 11 pages.
PCT International Search Report and Written Opinion, App. No. PCT/US2018/059062, dated Jan. 16, 2019, 6 pages.
PCT International Search Report and Written Opinion, App. No. PCT/US2018/059452, dated Jan. 16, 2019, 12 pages.
PCT International Search Report and Written Opinion, App. No. PCT/US2019/016259, dated Apr. 26, 2019, 6 pages.
PCT International Search Report and Written Opinion, App. No. PCT/US2019/046412, dated Jun. 24, 2020, 10 pages.
PCT International Search Report and Written Opinion, App. No. PCT/US2019/046419, dated Oct. 29, 2019, 14 pages.
PCT International Search Report and Written Opinion, App. No. PCT/US2019/046422, dated Dec. 3, 2019, 9 pages.
PCT International Search Report and Written Opinion, App. No. PCT/US2019/046573, dated Nov. 15, 2019, 9 pages.
PCT International Search Report and Written Opinion, App. No. PCT/US2019/051729, dated Nov. 20, 2019, 7 pages.
PCT Search Report and Written Opinion (Corrected), App. No. PCT/US2020/026925, dated May 12, 2020, 5 pages.
PCT Search Report and Written Opinion, App. No. PCT/US2020/012633, dated Jun. 2, 2020, 13 pages.
PCT Search Report and Written Opinion, App. No. PCT/US2020/012635, dated Jun. 4, 2020, 10 pages.
Piatek et al., LiDAR: A photonics guide to autonomous vehicle market, Hamamatsu.com, https://hub.hamamatsu.com/us/en/application-

(56) References Cited

OTHER PUBLICATIONS note/LiDAR-competingtechnologies-automotive/index.html (Nov. 18, 2017), 6 pages. (IPR Nos. '255 and '256 Exhibit 2136).
Piatek, Measuring distance with light, Hamamatsu.com, https://hub.hamamatsu.com/us/en/application-note/measuringdistance-with-light/index.html (Apr. 2, 2015), 18 pages. (IPR Nos. '255 and '256 Exhibit 2132).
Piatek, Presentation entitled 'LiDAR and Other Techniques—Measuring Distance with Light for Automotive Industry', authored by Slawomir Piatek, Technical Consultant, Hamamatsu Corp. (Dec. 6, 2017), 66 pages. (IPR Nos. '255 and '256 Exhibit 2131).
Popper, Guiding Light, The Billion-Dollar Widget Steering the Driverless Car Industry, The Verge (Oct. 18, 2017), 17 pages. (IPR Nos. '255 and '256 Exhibit 2076).
Qing, "Method of 3D visualization using laser radar on board of mobile robot," Journal of Jilin University (Information Science Ed.), vol. 22 (Jul. 2004), 4 pages.
*Quanergy Systems, Inc.* v. *Velodyne LiDAR, Inc.* (N.D. Cal.), Case No. 5:16-cv-05251, "Plaintiff Quanergy Systems, Inc.'s Amended Invalidity Contentions Pursuant to Patent Local Rule 3-3," May 23, 2017, 238 pages.
*Quanergy Systems, Inc.* v. *Velodyne LiDAR, Inc.* (N.D. Cal.), Case No. 5:16-cv-05251, "Plaintiff Quanergy Systems, Inc.'s Invalidity Contentions and Production of Documents Pursuant to Patent Local Rules 3-3 and 3-4," Mar. 27, 2017, 24 pages.
*Quanergy Systems, Inc.* v. *Velodyne LiDAR, Inc.* (N.D. Cal.), Case No. 5:16-cv-05251, Amended Complaint, Nov. 18, 2016, 6 pages.
*Quanergy Systems, Inc.* v. *Velodyne LiDAR, Inc.* (N.D. Cal.), Case No. 5:16-cv-05251, Answer to Counterclaim, (Jan. 16, 2017) 9 pages.
*Quanergy Systems, Inc.* v. *Velodyne LiDAR, Inc.* (N.D. Cal.), Case No. 5:16-cv-05251, Defendant Velodyne's Answer and Counterclaim, Dec. 5, 2016, 20 pages.
*Quanergy Systems, Inc.* v. *Velodyne LiDAR, Inc.* (N.D. Cal.), Complaint, Case No. 5:16-cv-05251 (Sep. 13, 2016), 21 pages.
Ramsey et al., Use Scenarios to Plan for Autonomous Vehicle Adoption, Gartner (Jun. 26, 2017), 17 pages. (IPR Nos. '255 and '256 Exhibit 2064).
Reutebuch, "LiDAR: an Emerging Tool for Multiple Resource Inventory," Journal of Forestry (Sep. 2005) 7 pages.
Reymann et al., Improving LiDAR Point Cloud Classification using Intensities and Multiple Echoes, IEE/RSJ International Conference on Intelligent Robots and Systems (Sep. 2015), 8 pages. (IPR Nos. '255 and '256 Exhibit 2167).
Riegl LMS-Q120, http://web.archive.org/web/20050113054822/http:/www.riegl.com/industrial_scanners_/lms_q120_/q120_all_.htm (2005), 4 pages.
Riegl, "Riegl LMS-Z210" (2003), 8 pages.
Robots for Roboticists, LIDAR Fundamentals, http://robotsforroboticists.com/lidar-fundamentals/ (May 5, 2014), 6 pages. (IPR Nos. '255 and '256 Exhibit 1068).
ROS-Drivers—Error in packet rate for the VLP-32C #142, GitHub Forum (Jan. 29, 2018), 1 page. (IPR Nos. '255 and '256 Exhibit 2041).
Search Report and Opinion, EP App. No. 07840406.8, dated Sep. 8, 2009, 6 pages.
Search Report and Opinion, EP App. No. 11166432.2, dated Jul. 28, 2011, 7 pages.
Search Report and Opinion, EP App. No. 17745112.7, dated Aug. 27, 2019, 8 pages.
Search Report and Opinion, EP App. No. 17770748.6, dated Oct. 22, 2019, 10 pages.
Search Report and Opinion, EP App. No. 17770926.8, dated Oct. 29, 2019, 11 pages.
Search Report and Opinion, EP App. No. 17770928.4, dated Oct. 29, 2019, 10 pages.
Search Report and Opinion, EP App. No. 17807474.6, dated Dec. 9, 2019, 9 pages.
Sensick, "DME 2000 / DME 3000: Precise non-contact distance determination," Sensick Catalogue (2006), pp. 450-457. (IPR Nos. '255 and '256 Exhibit 1073).
Sick DME 2000 Operating Instructions (Excerpt) (Brennan Deposition Exhibit 9) (May 2002), 42 pages. (IPR Nos. '255 and '256 Exhibit 2179).
Sick Laser Triangulation Sensors Product Information (Brennan Deposition Exhibit 6) (Jun. 25, 2018), 76 pages. (IPR Nos. '255 and '256 Exhibit 2176).
Sick LMS 200/ LMS 211/ LMS 220 / LMS 221/ LMS 291 Laser Measurement Systems—Technical Description (Brennan Deposition Exhibit 4) (Jun. 2003), 40 pages. (IPR Nos. '255 and '256 Exhibit 2174).
Sick LMS200/211/221/291 Laser Measurement Systems—Technical Description (Brennan Deposition Exhibit 3) (2006), 48 pages. (IPR Nos. '255 and '256 Exhibit 2173).
Sick Sensick Measuring Distance with Light—Distance Sensors Product Overview (Brennan Deposition Exhibit 10) (2004), 12 pages. (IPR Nos. '255 and '256 Exhibit 2180).
Sick, Sick ToF sensors at close range, https://web.archive.org/web/20040607070720/http:/www.sick.de:80/de/products/categories/industrial/distancesensors/dme2000/en.html (Jun. 7, 2004), 2 pages. (IPR Nos. '255 and '256 Exhibit 1082).
Singh, "Cyclone: A Laser Scanner for Mobile Robot Navigation" (Sep. 1991), pp. 1-18.
Song et al., Assessing the Possibility of Land-Cover Classification Using LiDAR Intensity Data, Commission III, PCV02 (2002), 4 pages. (IPR Nos. '255 and '256 Exhibit 2169).
Spies, "Extended Eyes—Sense and Avoid," Presented at the 2006 International Aerospace Exhibition, Berlin (May 2006), 22 pages.
Stone, "Performance analysis of next-generation LADAR for manufacturing, construction, and mobility" (May 2004), 198 pages.
Strang, Drawing of cross-section of I-beam by Jonathan Strang (Brennan Deposition Exhibit 5), (2018) 1 page. (IPR Nos. '255 and '256 Exhibit 2175).
strata-gee.com, Velodyne President Calls Strata-gee to Set the Record Straight, https://www.strata-gee.com/velodyne-president-calls-strata-gee-setrecord-straight/ (Jun. 26, 2014), 6 pages. (IPR Nos. '255 and '256 Exhibit 1137).
Strawa et al., The Measurement of Aerosol Optical Properties Using Continuous Wave Cavity Ring-Down Techniques, 20 Journal of Atmospheric and Oceanic Technology 454 (Apr. 2003), pp. 454-465. (IPR Nos. '255 and '256 Exhibit 2090).
Taranovich, Are processor algorithms key to safe self-driving cars? EDN ASIA, https://www.ednasia.com/news/article/are-processor-algorithms-key-tosafe-self-driving-cars (Jul. 7, 2016), 11 pages. (IPR Nos. '255 and '256 Exhibit 2206).
Taylor, An Introduction to Error Analysis—The Study of Uncertainties in Physical Measurements, Oxford University Press (1982), pp. 81-137. (IPR Nos. '255 and '256 Exhibit 1138).
The American Society of Mechanical Engineers, Welded and Seamless Wrought Steel Pipe, ASME B36.10M-2004 (Oct. 25, 2004), 26 pages. (IPR Nos. '255 and '256 Exhibit 2138).
Thin Lens Equation, http://hyperphysics.phyastr.gsu.edu/hbase/geoopt/lenseq.html (last visited Dec. 30, 2018) (Brennan Deposition Exhibit 7), 4 pages. (IPR Nos. '255 and '256 Exhibit 2177).
Thrun, "Probabilistic Terrain Analysis for High-Speed Desert Driving" (Oct. 2005), 7 pages.
Trepagnier, "Team gray technical paper," DARPA grand challenge 2005 (Aug. 28, 2005), 14 pages.
Turk, et al., VITS—A Vision System for Autonomous Land Vehicle Navigation, 10 IEEE No. 3 (May 1988), pp. 342-361. (IPR Nos. '255 and '256 Exhibit 2147).
U.S. District Court, Claim Construction Order, *Quanergy Systems, Inc.* v. *Velodyne LiDAR, Inc.,* Case No. 5:16-cv-5251-EJD (Oct. 4, 2017), 33 pages. (IPR Nos. '255 and '256 Exhibit 1027).
U.S. International Trade Commission, Investigation No. 337-TA-1173, "Respondent Hesai Photonics Technology Co., Ltd.'s Notice of Prior Art," Nov. 13, 2019, 35 pages.
U.S. International Trade Commission, Investigation No. 337-TA-1173, "Respondent Robosense's Notice of Prior Art," Nov. 13, 2019, 34 pages.

(56) References Cited

OTHER PUBLICATIONS

Ultra Puck, VLP-32C Data Sheet (2018), 2 pages. (IPR Nos. '255 and '256 Exhibit 2093).
Urmson, "High speed navigation of unrehearsed terrain: red team technology for grand challenge 2004" (Jun. 1, 2004), 47 pages.
USGS, EROS CalVal Center of Excellence (ECCOE), https://calval.cr.usgs.gov/wordpress/wpcontent/uploads/JACIE_files/JACIE06/Files/312Habib.pdf (Dec. 21, 2018), 3 pages. (IPR Nos. '255 and '256 Exhibit 1071).
Uwinnipeg, Centripetal Acceleration, Uwinnipeg.ca, http://theory.uwinnipeg.ca/physics/circ/node6.html (1997), 2 pages. (IPR Nos. '255 and '256 Exhibit 2157).
Velodyne Acoustics, Inc., Motor Specification, Merlin Project, Rev. E1 Initial Engineering Release (Apr. 29, 2009), 1 page. (IPR Nos. '255 and '256 Exhibit 2020).
Velodyne Acoustics, Inc., Motor Winding Specs., P2.0 , E2 Changed Material (Mar. 10, 2010), 1 page. (IPR Nos. '255 and '256 Exhibit 2022).
Velodyne Acoustics, Inc., Outline Drawing HDL-64E S3 Envelope Drawing, Rev. A (Apr. 21, 2015), 1 page. (IPR Nos. '255 and '256 Exhibit 2094).
Velodyne Lidar Products, PowerPoint (Jan. 18, 2017), 9 pages. (IPR Nos. '255 and '256 Exhibit 2031).
Velodyne Lidar, CAD Drawing of MotorStat-38in, HDL-64E (2018), 1 page. (IPR Nos. '255 and '256 Exhibit 2063).
Velodyne Lidar, CAD Drawing of MotorStat3in, HDL-64E(2018), 1 page. (IPR Nos. '255 and '256 Exhibit 2021).
Velodyne Lidar, CAD Drawing of Rotor, HDL-64E (2018), 1 page. (IPR Nos. '255 and '256 Exhibit 2026).
Velodyne Lidar, CAD Drawing of RotorAl, HDL-64E (2018), 1 page. (IPR Nos. '255 and '256 Exhibit 2027).
Velodyne Lidar, Envelope Hi Res VLP-16 Drawings, Rev. A (Jun. 30, 2016), 4 pages. (IPR Nos. '255 and '256 Exhibit 2061).
Velodyne Lidar, Excerpts of VLP-32C User Manual, 63/9325 Rev. B (2018), 26 pages. (IPR Nos. '255 and '256 Exhibit 2034).
Velodyne Lidar, First Sensor Annual Report (2016), pp. 1-143. (IPR Nos. '255 and '256 Exhibit 2038).
Velodyne Lidar, HDL-32E Data Sheet (2017), 2 pages. (IPR Nos. '255 and '256 Exhibit 2042).
Velodyne Lidar, HDL-32E Envelope Drawing (2018), 1 page. (IPR Nos. '255 and '256 Exhibit 2043).
Velodyne Lidar, HDL-32E Supported Sensors, Poly Synch Docs 2.3.2, http://docs.polysync.io/sensors/velodyne-hdl-32e/ (2018), 7 pages. (IPR Nos. '255 and '256 Exhibit 2055).
Velodyne Lidar, HDL-32E User's Manual and Programing Guide (Aug. 2016), 29 pages. (IPR Nos. '255 and '256 Exhibit 2044).
Velodyne Lidar, HDL-64E Data Sheet (2018), 2 pages. (IPR Nos. '255 and '256 Exhibit 2069).
Velodyne Lidar, HDL-64E S2 and S2.1 User's Manual and Programming Guide (Nov. 2012), 43 pages. (IPR Nos. '255 and '256 Exhibit 2050).
Velodyne Lidar, HDL-64E S2 Datasheet (Mar. 2010), 2 pages. (IPR Nos. '255 and '256 Exhibit 2047).
Velodyne Lidar, HDL-64E S3 Data Sheet (2016), 2 pages. (IPR Nos. '255 and '256 Exhibit 2048).
Velodyne Lidar, HDL-64E S3 User's Manual and Programming Guide (May 2013), 54 pages. (IPR Nos. '255 and '256 Exhibit 2051).
Velodyne Lidar, HDL-64E User's Manual (Mar. 2008), 21 pages. (IPR Nos. '255 and '256 Exhibit 2052).
*Velodyne Lidar, Inc.* v. *Hesai Photonics Technology Co., Ltd.* (N.D. Cal.), Complaint, Case No. 5:19-cv-04742 (Aug. 13, 2019), 13 pages.
*Velodyne Lidar, Inc.* v. *Sunteng Innovation Technology Co., Ltd.* ("Robosense") (N.D. Cal.), Complaint, Case No. 5:19-cv-04746 (Aug. 13, 2019), 13 pages.
Velodyne Lidar, Inc., Production Worksheet Detector, Item #24-AD5009 in Production, AD500-9 NIR Photodiode (Jan. 18, 2018), 1 page. (IPR Nos. '255 and '256 Exhibit 2024).
Velodyne Lidar, Inc., Production Worksheet, Item #30-AD230CER2 in Production, APD, 230UM, Ceramic Submount (Jan. 17, 2018), 1 pages. (IPR Nos. '255 and '256 Exhibit 2023).
Velodyne Lidar, It Began With a Race . . . 16 Years of Velodyne LiDAR, Velodyne LiDAR Blog, available at http://velodynelidar.com/blog/it-began-with-a-race/ (2018), 8 pages. (IPR Nos. '255 and '256 Exhibit 2070).
Velodyne Lidar, Product Guide (2018), 1 page. (IPR Nos. '255 and '256 Exhibit 2058).
Velodyne Lidar, Puck, Real-time 3D LiDAR Sensor, VLP-16 Data Sheet (2017), 2 pages. (IPR Nos. '255 and '256 Exhibit 2060).
Velodyne Lidar, Ultra Puck™ VLP-32 Data Sheet (2014), 2 pages. (IPR Nos. '255 and '256 Exhibit 2032).
Velodyne Lidar, Velodyne Donates LiDAR and Robotic Artifacts to Smithsonian, Point of Engineering, Point of Beginning (May 23, 2011), 2 pages. (IPR Nos. '255 and '256 Exhibit 2078).
Velodyne Lidar, VLP-16 User's Manual and Programming Guide (Mar. 2016), 49 pages. (IPR Nos. '255 and '256 Exhibit 2062).
Velodyne Lidar, VLP-32C User Manual, 63-9325 Rev. B. (Feb. 2, 2018), 136 pages. (IPR Nos. '255 and '256 Exhibit 2114).
Velodyne Lidar, Webserver User Guide VLP-16 & HDL-32E (63/6266 Rev A) (Nov. 2015), 32 pages. (IPR Nos. '255 and '256 Exhibit 2013).
Velodyne Lidar, White Paper, Velodyne's HDL-64E: A High Definition Lidar Sensor for 3-D Applications (Oct. 2007), 7 pages. (IPR Nos. '255 and '256 Exhibit 2059).
Velodyne, Velodyne—High Definition Lidar—Overview https://web.archive.org/web/20071107104255/http://www.velodyne.com:80/lidar/products/overview.aspx (Nov. 7, 2007), 1 page. (IPR Nos. '255 and '256 Exhibit 1091).
Velodyne, Velodyne HDL Applications, https://web.archive.org/web/20080716041931/http://www.velodyne.com:80/lidar/technology/applications.aspx (Jul. 16, 2008), 1 page. (IPR Nos. '255 and '256 Exhibit 1106).
Velodyne, Velodyne HDL-64E user manual, https://web.archive.org/web/20081117092628/http://www.velodyne.com/lidar/products/manual/HDL-64E%20Manual.pdf (Nov. 17, 2008), 23 pages. (IPR Nos. '255 and '256 Exhibit 1090).
Velodynelidar, Data to Improve the Cost, Convenience and Safety of Motor Vehicles, https://velodynelidar.com/industry.html (2018), 6 pages. (IPR Nos. '255 and '256 Exhibit 1125).
Weber, Where to? A History of Autonomous Vehicles, Computer History Museum, https://supportgarmin.com/en-US/?faq=IVeHYIKwChAY0qCVhQiJ67 (May 8, 2014), 23 pages. (IPR Nos. '255 and '256 Exhibit 2146).
Widmann, "Development of Collision Avoidance Systems at Delphi Automotive Systems" (1998), pp. 353-358.
Wikipedia, "Laser" (Nov. 10, 2017), 25 pages. (IPR Nos. '255 and '256 Exhibit 1022).
Willhoeft et al., "Quasi-3D Scanning with Laserscanners," IBEO Automobile Sensor, 8th World Congress on Intelligent Transport Systems—Quasi-3D Scanning (2001), IBEO Automobile Sensor, 8th World Congress on Intelligent Transport Systems—Quasi-3D Scanning (2001), 12 pages. (IPR Nos. '255 and '256 Exhibit 1077).
Williams, Bias Voltage and Current Sense Circuits for Avalanche Photodiodes—Feeding and Reading the APD, Linear Technology AN92-1 (Nov. 2012), 32 pages. (IPR Nos. '255 and '256 Exhibit 2125).
Williams, Driverless cars yield to reality: It's a long road ahead, PC World (Jul. 8, 2013), 6 pages. (IPR Nos. '255 and '256 Exhibit 2073).
Wulf et al., "Fast 3D Scanning Methods for Laser Measurement Systems, CSCS-14, 14th Int'l Conference on Control Systems and Computer Science" (Jul. 2003), pp. 312-317. (IPR Nos. '255 and '256 Exhibit 1078).
Wulf, "2D Mapping of Cluttered Indoor Environments by Means of 3D Perception," Proceedings of the 2004 IEEE International Conference on Robotics & Automation (Apr. 2004), pp. 4204-4209.
Yu et al., A New 3D Map Reconstruction Based Mobile Robot Navigation, IEEE (2006), 4 pages. (IPR Nos. '255 and '256 Exhibit 2189).

(56) References Cited

OTHER PUBLICATIONS

Zappa, et al, SPADA: Single-Photon Avalanche Diode Arrays, IEEE Photonics Technology Letters, vol. 17, No. 3 (Mar. 2005), 9 pages. (IPR Nos. '255 and '256 Exhibit 1135).
Zhao, "A vehicle-borne urban 3-D acquisition system using single-row laser range scanners," IEEE transactions on systems, man, and cybernetics, vol. 33, No. 4 (Aug. 2003), pp. 658-666.
Zhao, "Reconstructing Textured CAD Model of Urban Environment Using Vehicle-Borne Laser Range Scanners and Line Cameras," Lecture Notes in Computer Science, vol. 2095 (2001), pp. 284-297.
Zheng, "The Technique of Land 3D Laser Scanning and Imaging Surveying," Railway Aerial Survey, vol. 2 (2003), 3 pages.
European Patent Office, Office Action, App. No. 18886541.4 (dated Jun. 3, 2020), 3 pages.
Glennie, C., et al., "A Comparison of Laser Scanners for Mobile Mapping Applications," Abstract and slides for a presentation given in 2011, 22 pages.
Glennie, C., et al., "Static Calibration and Analysis of the Velodyne HDL-64E S2 for High Accuracy Mobile Scanning," Remote Sensing 2010, 2: pp. 1610-1624.
Merriam-Webster, Aperture definition, https://web.archive.org/web/20170817144540/https://www.merriam-webster.com/dictionary/aperture (Aug. 17, 2017), 4 pages.
Milenkovic, "Introduction to LIDAR," NEWFOR2014 Summer School (Jul. 2014), 77 pages (IPR. Nos. '255 and '256, Exhibit 2166).
Russian Patent Office, Office Action, App. No. 2020121407 (dated Jul. 23, 2020), 5 pages.
Satterfield, B., et al., "Advancing Robotics: The Urban Challenge Effect," Journal of Aerospace Computing, Information, and Communication, vol. 5, Dec. 2008, pp. 530-542.
Sick, "Distance Sensors," https://web.archive.org/web/20041213053807/http:/www.lpc-uk.com:80/sick/sickdist.htm (Dec. 13, 2004), 3 pages.
U.S. International Trade Commission, Investigation No. 337-TA-1173, Appendix B to Respondent's Response to the Complaint and Notice of Investigation, Oct. 21, 2019, pp. 1-4.
U.S. International Trade Commission, Investigation No. 337-TA-1173, "Complainant Velodyne and Respondent Hesai's Joint Notice," Jul. 9, 2020, 3 pages.
U.S. International Trade Commission, Investigation No. 337-TA-1173, "Complainant Velodyne Lidar Inc.'s Motion for Summary Determination," Public Version, Mar. 6, 2020, 168 pages.
U.S. International Trade Commission, Investigation No. 337-TA-1173, "Complainant Velodyne Lidar Inc.'s Opposition to Respondent Hesai's Motion for Summary Determination of Invalidity of U.S. Pat. No. 7,969,558," Public Version, Mar. 18, 2020, 184 pages.
U.S. International Trade Commission, Investigation No. 337-TA-1173, "Complainant Velodyne Lidar, Inc.'s Disclosure of Domestic Industry Products," Nov. 8, 2019, 3 pages.
U.S. International Trade Commission, Investigation No. 337-TA-1173, "Complainant Velodyne Lidar, Inc.'s Motion in Limine No. 3 to Exclude Evidence and Testimony that Krumes Discloses any Limitations of Claims 2 and 9 of the '558 Patent," Sep. 2, 2020, 26 pages.
U.S. International Trade Commission, Investigation No. 337-TA-1173, "Complainant Velodyne's Motion in Limine No. 1 to Limit the Testimony of Robosense's Expert, Jason Janet, PhD.," Public Version, Sep. 2, 2020, 34 pages.
U.S. International Trade Commission, Investigation No. 337-TA-1173, "Complainant Velodyne's Motion in Limine No. 2 to Exclude any Testimony from Dr. Janet Regarding an Alleged Motivation to Combine or Reasonable Expectation of Success," Public Version, Sep. 2, 2020, 22 pages.
U.S. International Trade Commission, Investigation No. 337-TA-1173, "Complainant Velodyne's Supplemental Motion for Summary Determination Regarding Inventorship," Public Version, Sep. 10, 2020, 26 pages.
U.S. International Trade Commission, Investigation No. 337-TA-1173, "Complaint of Velodyne Lidar, Inc. Under Section 337 of the Tariff Act of 1930, as Amended," Aug. 15, 2019, 45 pages.
U.S. International Trade Commission, Investigation No. 337-TA-1173, "Initial Determination Granting Joint Motion for Termination of the Investigation as to Respondent Hesai Based on a Settlement and Request for Limited Service of Settlement Agreement under CFR §210.21(b)," Public Version, Jul. 13, 2020, 4 pages.
U.S. International Trade Commission, Investigation No. 337-TA-1173, "Joint Chart of Substantive Legal Issues Being Litigated," Sep. 17, 2020, 5 pages.
U.S. International Trade Commission, Investigation No. 337-TA-1173, "Joint Chart of Substantive Legal Issues Being Litigated," Sep. 8, 2020, 6 pages.
U.S. International Trade Commission, Investigation No. 337-TA-1173, "Joint Motion for and Memorandum in Support of Termination of the Investigation as to Respondent Hesai Based on a Settlement and Request for Limited Service of Settlement Agreement under 19 CFR §210.21(b)," Public Version, Jul. 8, 2020, 77 pages.
U.S. International Trade Commission, Investigation No. 337-TA-1173, "Order No. 27: Denying without Prejudice Velodyne's Motion for Summary Determination," Public Version, May 12, 2020, 11 pages.
U.S. International Trade Commission, Investigation No. 337-TA-1173, "Respondent Hesai's Motion for Summary Determination of Invalidity of U.S. Pat. No. 7,969,558," Public Version, Mar. 6, 2020, 109 pages.
U.S. International Trade Commission, Investigation No. 337-TA-1173, "Respondent Robosense's Opposition to Complainant Velodyne's Motion in Limine No. 3 to Exclude Evidence and Testimony That Krumes Discloses Any Limitations of Claims 2 and 9 of the '558 Patent," Sep. 9, 2020, 10 pages.
U.S. International Trade Commission, Investigation No. 337-TA-1173, "Respondent Robosense's Response in Opposition to Complainant Velodyne Lidar, Inc.'s Motion in Limine No. 1," Sep. 9, 2020, 11 pages.
U.S. International Trade Commission, Investigation No. 337-TA-1173, "Respondent RoboSense's Response in Opposition to Complainant Velodyne Lidar, Inc.'s Renewed Motion for Summary Determination Regarding Inventorship," Public Version, Sep. 8, 2020, 12 pages.
U.S. International Trade Commission, Investigation No. 337-TA-1173, "Respondent Robosense's Response in Opposition to Complainant's Motion in Limine No. 2," Sep. 9, 2020, 13 pages.
U.S. International Trade Commission, Investigation No. 337-TA-1173, "Respondent Suteng Innovation Technology Co., Ltd.'s Response to the Complaint and Notice of Investigation," Public Version, Oct. 21, 2019, 31 pages.
U.S. International Trade Commission, Investigation No. 337-TA-1173, "Respondents' Memorandum in Opposition to Complainant Velodyne Lidar Inc.'s Motion for Summary Determination," Public Version, Mar. 18, 2020, 190 pages.
U.S. International Trade Commission, Investigation No. 337-TA-1173, "Respondents' Response to the Complaint and Notice of Investigation," Public Version, Oct. 21, 2019, 36 pages.
Velodyne Lidar, Excerpts of Business Records (2007-2012), 2 pages. (IPR Nos. '255 and '256 Exhibit 2084).
Wikipedia, "Cassegrain reflector," Dec. 12, 2014, 5 pages. (downloaded from Internet Archive, Sep. 29, 2020).
Neff, "The Laser That's Changing the World," Prometheus Books (2018), pp. 193-204 and 270-271.
U.S. International Trade Commission, Investigation No. 337-TA-1173, "Complainant Velodyne Lidar Inc.'s Opposition to Respondent Hesai's Motion to Amend," Public Version, Feb. 28, 2020, 108 pages.
U.S. International Trade Commission, Investigation No. 337-TA-1173, "Hesai's Motion for Leave to Amend Its Response to the Complaint and Notice of Investigation," Public Version, Feb. 18, 2020, 82 pages.
U.S. International Trade Commission, Investigation No. 337-TA-1173, "Hesai's Unopposed Motion for Leave to File a Reply in Support of Its Motion to Amend Its Response to the Complaint and Notice of Investigation," Public Version, Mar. 6, 2020, 30 pages.

(56) References Cited

OTHER PUBLICATIONS

U.S. International Trade Commission, Investigation No. 337-TA-1173, "Order No. 26: Granting Hesai's Motion for Leave to Amend Its Response to the Complaint and Notice of Investigation," May 7, 2020, 6 pages.
Hall, et al., "Team DAD Technical Paper," DARPA Grand Challenge 2005, XP-002543336, pp. 1-12; Aug. 26, 2005.

* cited by examiner

HIGH DEFINITION LIDAR SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM *AND CROSS-REFERENCES TO RELATED APPLICATIONS*

This application is a *reissue continuation of application Ser. No. 15/180,580, filed Jun. 13, 2016, which is an application for reissue of U.S. Pat. No. 8,767,190, issued Jul. 1, 2014, which claims the benefit of U.S. provisional application Ser. No. 61/345,505, filed May 17, 2010, and which is a* continuation-in-part of U.S. application Ser. No. 11/777,802, *now U.S. Pat. No. 7,969,558,* filed Jul. 13, 2007, [and further] *which* claims the benefit of U.S. provisional application Ser. No. 60/807,305 filed Jul. 13, 2006[, and U.S. provisional application Ser. No. 61/345,505 filed May 17, 2010]. *Notice: more than one reissue application has been filed for the reissue of U.S. Pat. No. 8,767,190. The reissue applications are U.S. application Ser. No. 15,180, 580, filed Jun. 13, 2016; U.S. application Ser. Nos. 15/700, 543, 15/700,558, 15/700,571, 15/700,836, 15/700,844, 15/700,959, and 15/700,965, each of which was filed on Sep. 11, 2017; and U.S. application Ser. No. 16/912,648, filed Jun. 25, 2020.* The contents of each of the foregoing applications are hereby incorporated by reference.

BACKGROUND OF THE INVENTION

The present invention concerns the use of light pulses that are transmitted, reflected from external objects, and received by a detector to locate the objects in the field of view of the transmitter. By pulsing a laser emitter and receiving the reflection, the time required for the pulse of light to return to the detector can be measured, thereby allowing a calculation of the distance between the emitter and the object from which the pulse was reflected.

When multiple pulses are emitted in rapid succession, and the direction of those emissions is varied, each distance measurement can be considered a pixel, and a collection of pixels emitted and captured in rapid succession (called a "point cloud") can be rendered as an image or analyzed for other reasons such as detecting obstacles. Viewers that render these point clouds can manipulate the view to give the appearance of a 3-D image.

In co-pending application Ser. No. 11/777,802, the applicant described a variety of systems for use in creating such point cloud images using Laser Imaging Detection and Ranging (LiDAR). In one version, the LiDAR system was used for terrain mapping and obstacle detection, and incorporated as a sensor for an autonomous vehicle. An exemplary LiDAR system included eight assemblies of eight lasers each as shown in FIG. 1, or two assemblies of 32 lasers each forming a 64-element LiDAR system as shown in FIG. 2. Yet other numbers of lasers or detectors are possible, and in general the LiDAR was employed in an assembly configured to rotate at a high rate of speed in order to capture a high number of reflected pulses in a full circle around the LiDAR sensor.

The preferred examples of the present invention described further below build on the inventor's prior work as described above, incorporating several improvements to reduce the overall size and weight of the sensor, provide better balance, reduce crosstalk and parallax, and provide other advantages.

SUMMARY OF THE INVENTION

The present invention provides a LiDAR-based 3-D point cloud measuring system. An example system includes a base, a housing, a plurality of photon transmitters and photon detectors contained within the housing, a rotary motor that rotates the housing about the base, and a communication component that allows transmission of signals generated by the photon detectors to external components.

In one version of the invention, the system provides 32 emitter/detector pairs aligned along a vertical axis within a housing that spins to provide a 360 degree field of view. The emitters may be aligned along a first axis, with the detectors aligned along a second axis adjacent to the first.

In a preferred implementation, the emitters and detectors are mounted on thin circuit boards such as ceramic hybrid boards allowing for installation on a vertical motherboard for a vertical configuration, improved alignment, and other advantages. The motherboard, in one version is formed with a hole in which the emitters fire rearward into a mirror, reflecting the emitted light through the hole and through lenses adjacent the motherboard.

In certain configurations, the system employs a conjoint lens system that reduces or eliminates the parallax problem that may arise with the use of separate emitter and detector optics.

In still further examples of the invention, the emitters fire in a non-adjacent pattern, and most preferably in a pattern in which sequentially fired lasers are physically distant from one another in order to reduce the likelihood of crosstalk.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
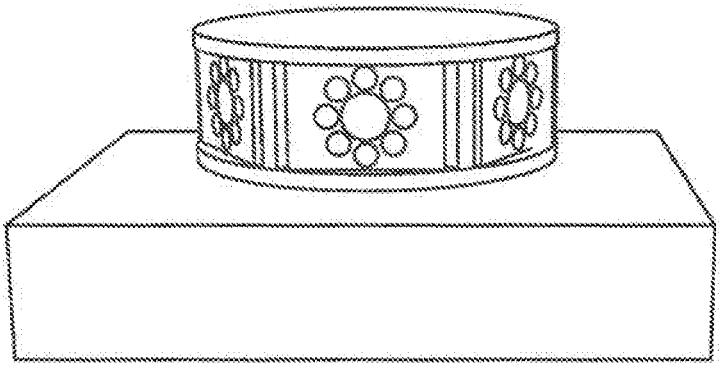
FIG. 1 is a front view of a rotating LiDAR system.
Figure 2:
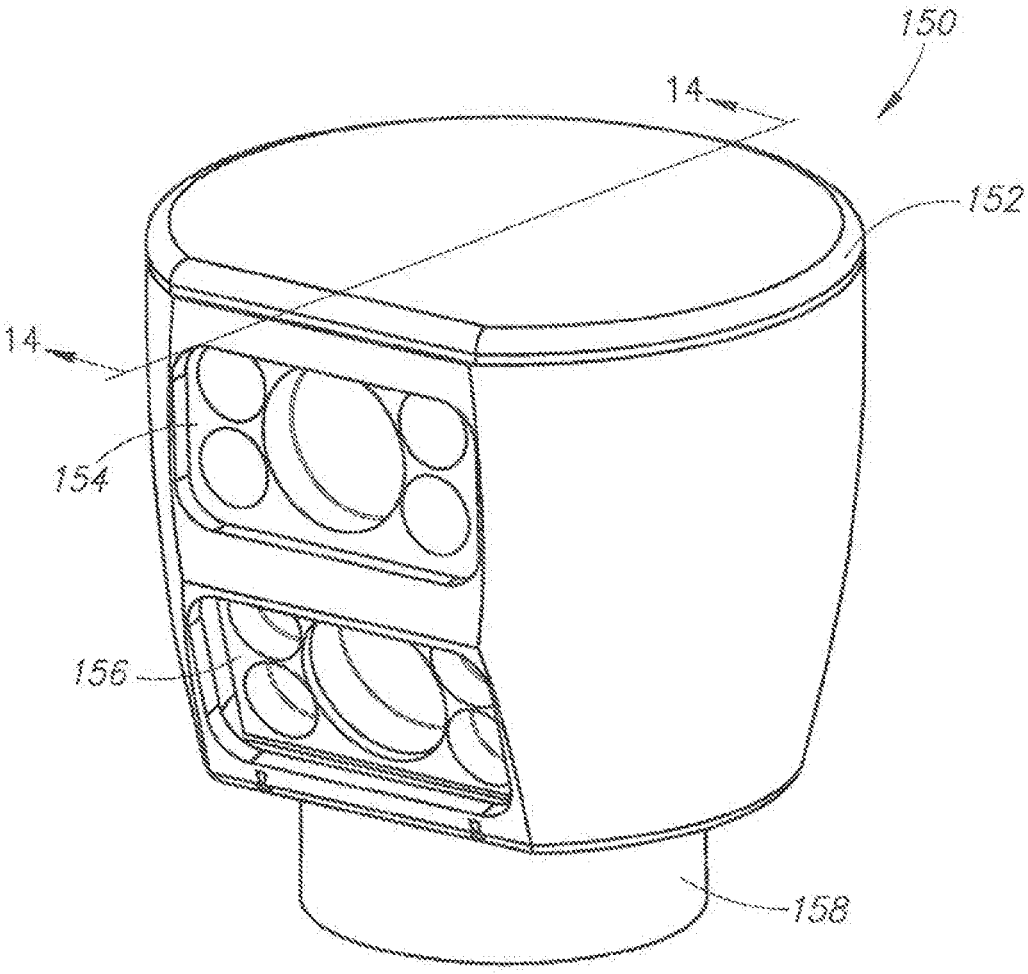
FIG. 2 is a perspective view of an alternate LiDAR system.

Exemplary LiDAR systems are shown in FIGS. 1 and 2. In each case, a rotating housing fires light pulses that reflect from objects so that the return reflections may be detected by detectors within the rotating housing. By rotating the housing, the system provides a 360-degree horizontal field of view (FOV) and, depending on the number and orientation of lasers within the housing, a desired vertical field of view. The system is typically mounted on the top center of a vehicle, giving it a clear view in all directions, and rotates at a rate of about 10 Hz (600 RPM), thereby providing a high point cloud refresh rate, such high rate being advantageous for autonomous navigation at higher speeds. In other versions, the spin rate is within a range of about 5 to 20 Hz (300-1200 RPM). At this configuration, the system can collect approximately 2.56 million time of flight (TOF) distance points per second. The system therefore provides the unique combination of 360 degree FOV, high point cloud density, and high refresh rate. The standard deviation of TOF distance measurements is equal to or less than 2 cm. The LiDAR system may incorporate an inertial navigation system (INS) sensor system mounted on it to report x, y, z deviations and pitch, roll, and yaw of the unit that is used by navigational computers to correct for these deviations.

Through the use of DSP a dynamic power feature allows the system to increase the intensity of the laser emitters if a clear terrain reflection is not obtained by photo detectors (whether due to reflective surface, weather, dust, distance, or other reasons), and to reduce power to the laser emitters for laser life and safety reasons if a strong reflection signal is detected by photo detectors. A direct benefit of this feature is that the LiDAR system is capable of seeing through fog, dust, and heavy rain by increasing laser power dynamically and ignoring early reflections. The unit also has the capability to receive and decipher multiple returns from a single laser emission through digitization and analysis of the waveform generated by the detector as the signal generated from the emitter returns.

The LiDAR systems of FIGS. 1 and 2 report data in the form of range and intensity information via Ethernet (or similar output) to a master navigational system. Using standard trigonometry, the range data is converted into x and y coordinates and a height value. The height value can be corrected for the vehicle's pitch and roll so the resulting map is with reference to the horizontal plane of the vehicle. The map is then "moved" in concert with the vehicle's forward or turning motion. Thus, the sensor's input is cumulative and forms an ultra-high-density profile map of the surrounding environment.

This highly detailed terrain map is then used to calculate obstacle avoidance vectors if required and to determine the maximum allowable speed given the terrain ahead. The LiDAR system identifies of size and distance of objects in view, including the vertical position and contour of a road surface. The anticipated offset of the vehicle from a straight, level path, either vertical or horizontal, at different distances is translated into the G-force that the vehicle will be subject to when following the proposed path at the current speed. That information can be used to determine the maximum speed that the vehicle should be traveling, and acceleration or braking commands are issued accordingly. In all cases the software seeks the best available road surface (and thus the best possible speed) still within the boundaries of a global positioning system (GPS) waypoint being traversed.

One version of the inventor's prior system as illustrated in FIG. 1 includes 64 emitter/detector (i.e. laser diode/photo diode) pairs divided into eight groups of eight. The system shown in FIG. 2 also includes 64 emitter/detector pairs, but in a configuration of 2 assemblies of 32 pairs. It is also possible to "share" a single detector among several lasers by focusing several detection regions onto a single detector, or by using a single, large detector. By firing a single laser at a time, there would be no ambiguity as to which laser is responsible for a return signal. Conversely, one could also sub-divide a single laser beam into several smaller beams. Each beam would be focused onto its own detector. In any event, such systems are still considered emitter-detector pairs.

In the versions as illustrated in FIGS. 1 and 2, the laser diode is preferably an OSRAM 905 nm emitter, and the photo diode is preferably an Avalanche variety. More particularly, in the preferred version each one of the detectors is an avalanche photodiode detector. The lenses are preferably UV treated to block sunlight, or employ a separate UV lens filter in the optical path. Each pair is preferably physically aligned in ⅓° increments, ranging from approximately 2° above horizontal to approximately 24° below horizontal. Each of the emitter/detector pairs are controlled by one or more DSPs (or, in some versions, field programmable gate arrays, or FPGAs, or other microprocessor), which determines when they will fire, determines the intensity of the firing based on the previous return, records the time-of-flight, calculates height data based time-of-flight and angular alignment of each pair. Results, including multiple returns if any, are transmitted via Ethernet to the master navigational computer via a rotary coupling.

It is also advantageous to fire only several lasers, or preferably just one, at a time. This is because of naturally occurring crosstalk, or system blinding that occurs when the laser beam encounters a retroreflector. Such retroreflectors are commonly used along the roadways. A single beam at a time system is thus resistant to retroreflector blinding, while a flash system could suffer severe image degradation as a result.

In addition to crosstalk concerns, firing single lasers at once while rotating at a high rate facilitates eye safety. The high powered lasers used with the present preferred versions of the invention would require protective eyewear if the system was used in a stationary fashion. Rotation of the system and firing fewer lasers at once for brief pulses allows high powered lasers to be used while still meeting eye safety requirements that do not require protective eyewear. In accordance with this aspect of the invention, the system employs a control component that does not allow the emitters to fire until the head has reached a desired minimal rotation speed.

Another advantage of firing only a small number of lasers at a time is the ability to share, or multiplex, the detection circuitry among several detectors. Since the detection circuitry consists of high speed Analog to Digital Converters (ADCs), such as those made by National Semiconductor, considerable cost savings can be had by minimizing the use of these expensive components.

In the preferred embodiment, the detectors are power cycled, such that only the desired detector is powered up at any one time. Then the signals can simply be multiplexed together. An additional benefit of power-cycling the detectors is that total system power consumption is reduced, and the detectors therefore run cooler and are therefore more sensitive.

A simple DC motor controller driving a high reliability brushed or brushless motor controls the rotation of the emitter/detectors. A rotary encoder feeds rotational position to the DSPs (or other microprocessor) that use the position data to determine firing sequence. Software and physical fail-safes ensure that no firing takes place until the system is rotating at a minimum RPM.

FIG. 2 illustrates a perspective view of a 64 emitter/detector pair LiDAR component 150. The component 150 includes a housing 152 that is opened on one side for receiving a first LiDAR system 154 located above a second LiDAR system 156. The second LiDAR system 156 is positioned to have line of sight with a greater angle relative to horizontal than the first LiDAR system 154. The housing 152 is mounted over a base housing section 158.

The LiDAR system of FIG. 2 includes a magnetic rotor and stator. A rotary coupling, such as a three-conductor Mercotac model 305, passes through the center of the base 158 and the rotor. The three conductors facilitated by the rotary coupling are power, signal, and ground. A bearing mounts on the rotary coupling. A rotary encoder has one part mounted on the rotary coupling and another part mounted on the base section 158 of the housing 152. The rotary encoder, such as a U.S. Digital Model number E65-1000-750-I-PKG1 provides information regarding to rotary position of the housing 152. The magnetic rotor and stator cause rotary motion of the base section 158 and thus the housing 152 about the rotary coupling.

The version described below with reference to FIGS. 3-16 is generally referred to as an High Definition LiDAR 32E (HDL-32E) and operates on the same foundational principles as the sensors of FIGS. 1 and 2 in that a plurality (in this embodiment up to 32) of laser emitter/detector pairs are aligned along a vertical axis with the entire head spinning to provide a 360 degrees horizontal field of view (FOV). Each laser issues light pulses (in this version, 5 ns pulses) that are analyzed for time-of-flight distance information (called a "distance pixel" or "return"). Like the system of FIG. 2, the system reports returns in Ethernet packets, providing both distance and intensity (i.e. the relative amount of light received back from the emitter) information for each return. The sample system reports approximately 700,000 points per second. While all or any subset of the features described above with respect to FIGS. 1 and 2 may be incorporated into the version described below with respect to FIGS. 3-16, alternate embodiments of the invention may optionally include the additional aspects as described in detail below.

Figure 3:
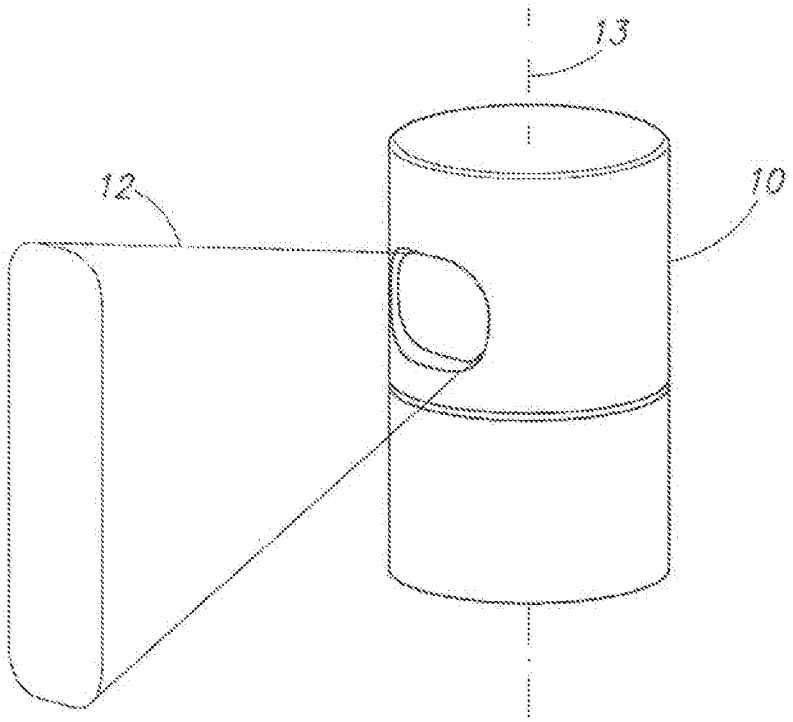
FIG. 3 is a perspective view of a preferred LiDAR system, showing an exemplary field of view of the laser emitters.

In a preferred version as illustrated in FIG. 3, the cylindrical sensor head 10 is about 3.5 inches in diameter and the unit has an overall height of 5.6 inches and weighs about 2.4 pounds. By contrast, the HDL-64E (shown in FIG. 2) is 8 inches in diameter by approximately one foot tall, and weighs about 29 pounds. This reduction in size is the result of several inventive improvements, as described more fully below.

Figure 4:
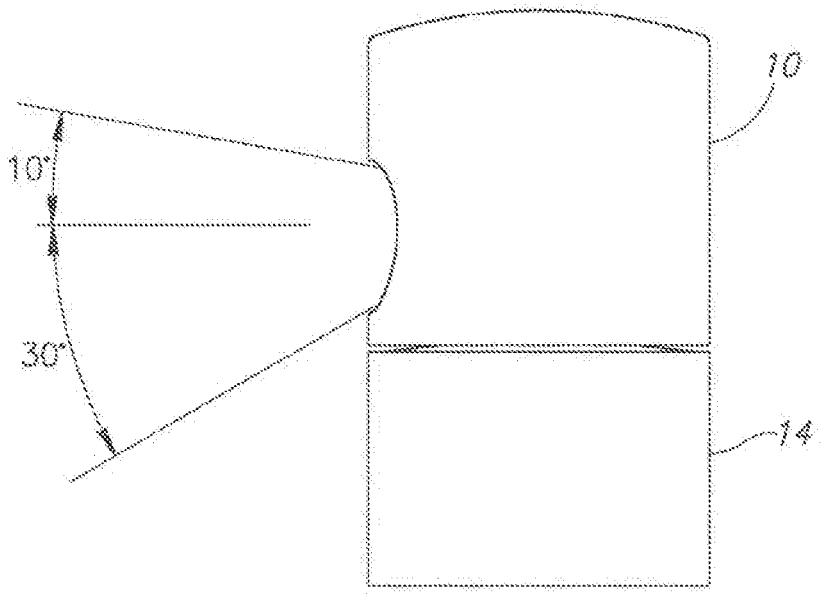
FIG. 4 is a side view of the preferred LiDAR system of FIG. 3.

The sample embodiment of FIG. 3 can be built with a variable number of lasers, aligned over a vertical FOV 12 of +10 to −30 degrees as best seen in FIG. 4. The vertical FOV may be made larger or smaller, as desired, by adjusting the number or orientation of the emitters and detectors. When using the emitters as described and orienting them as described, the range is approximately 100 meters. The head 10 is mounted on a fixed platform 14 having a motor configured such that it preferably spins at a rate of 5 Hz to 20 Hz (300-1200 RPM). The sample system uses 905 nm laser diodes (although other frequencies such as 1550 nm could be used) and is Class 1 eye safe.

Figure 5:
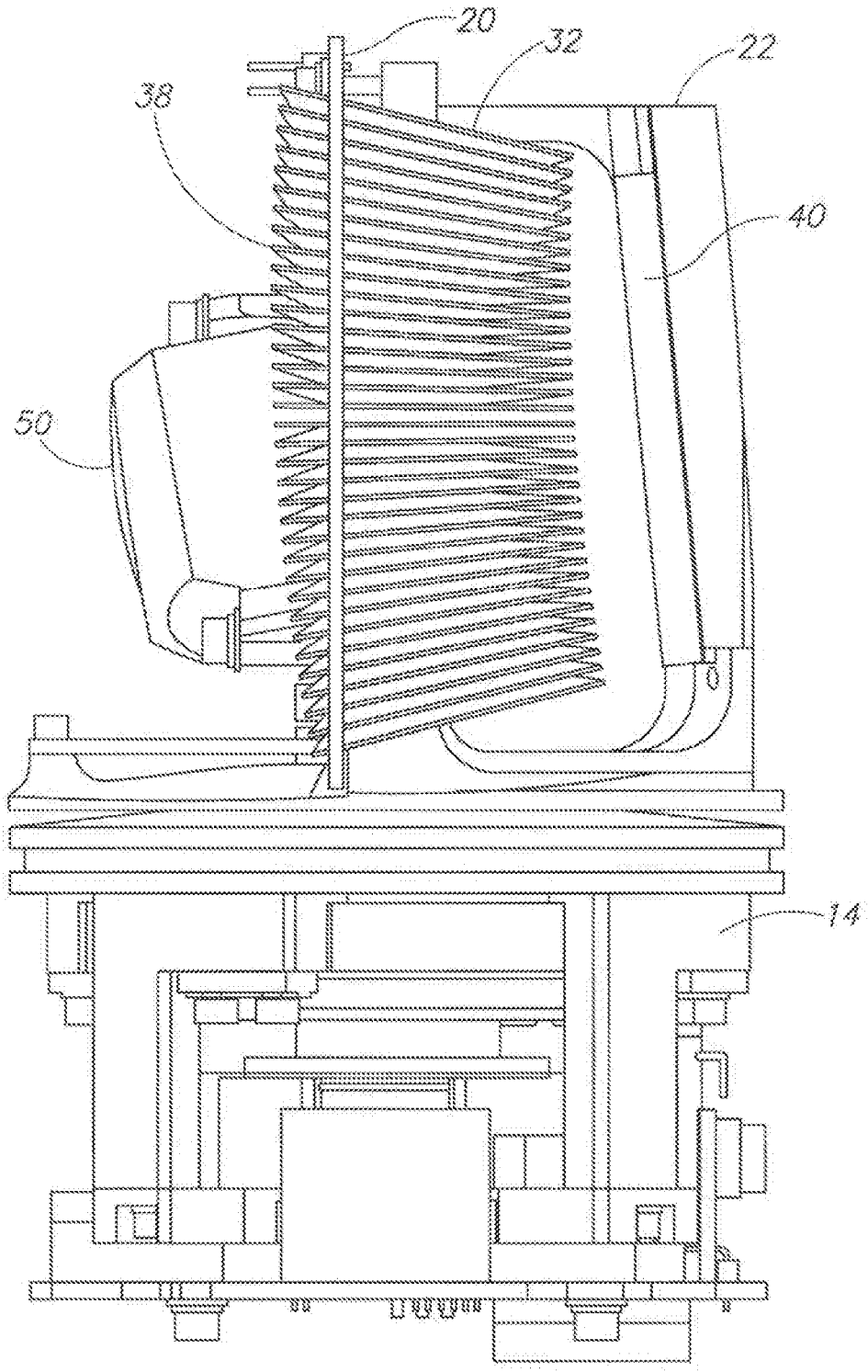
FIG. 5 is a side view of the LiDAR system in accordance with FIG. 4, shown with the housing removed.

FIG. 5 illustrates the same version as shown in FIGS. 3 and 4, though without the outer housing covering the internal components. In general, and as discussed more fully below, the system includes a main motherboard 20 supporting a plurality of detector hybrids 32 and emitter hybrids (not visible in FIG. 5). The emitters fire back toward the rear of the system, where the pulses are reflected from a mirror and then are directed through a lens 50. Return pulses pass through a lens, are reflected by a mirror 40, then directed to the detectors incorporated into the hybrids 32. The motherboard 20 and mirror 40 are mounted to a common frame 22 providing common support and facilitating alignment.

The hybrids 32 are mounted to the motherboard in a fan pattern that is organized about a central axis. In the version as shown, 32 hybrids are used in a pattern to create a field of view extending 10 degrees above and 30 degrees below the horizon and therefore the central axis extends above and below the ninth board 38, with 8 boards above and 23 boards below the central axis. In one version, each successive board is inclined an additional one and one-third degree with respect to the next adjacent board. The desired incremental and overall inclination may be varied depending on the number of hybrids used, the geometry of the mirrors and lenses, and the desired range of the system.

Figure 6:
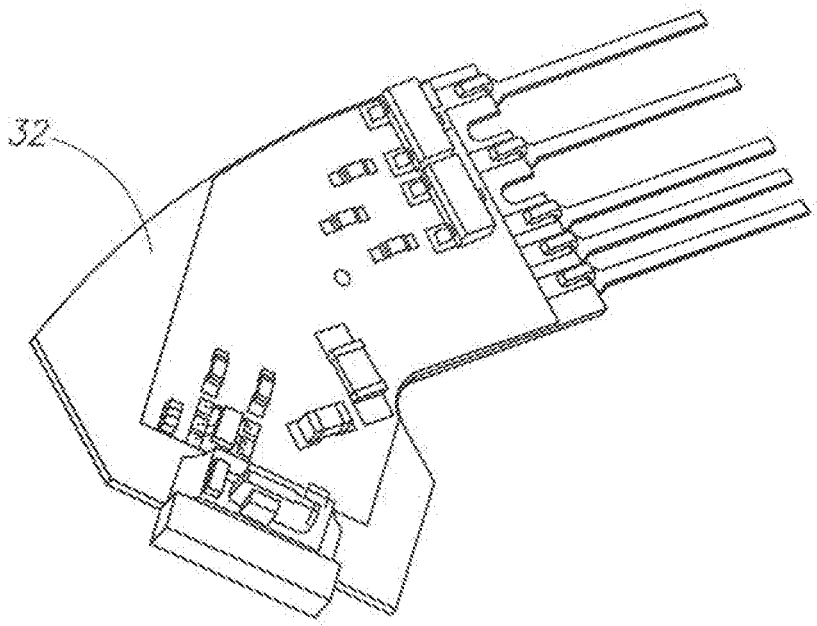
FIG. 6 is a perspective view of a hybrid containing a preferred detector.
Figure 7:
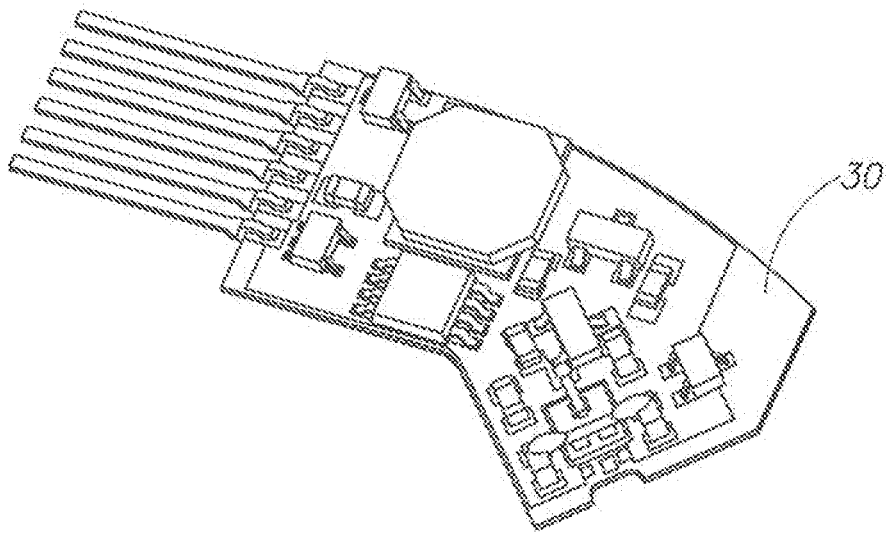
FIG. 7 is a perspective view of a hybrid containing a preferred emitter.

One of the features allowing for compact size and improved performance of the version of FIG. 3 is the use of thin circuit boards such as ceramic hybrid boards for each of the emitters and detectors. An exemplary detector circuit board 32 is shown in FIG. 6; an exemplary emitter circuit board 30 is shown in FIG. 7. In the preferred example, the thin circuit boards are in the form of ceramic hybrid boards that are about 0.015 inches thick, with only one emitter mounted on each emitter board, and only one detector mounted on each detector board. In other versions the thin circuit boards may be formed from other materials or structures instead of being configured as ceramic hybrids.

Figure 8:
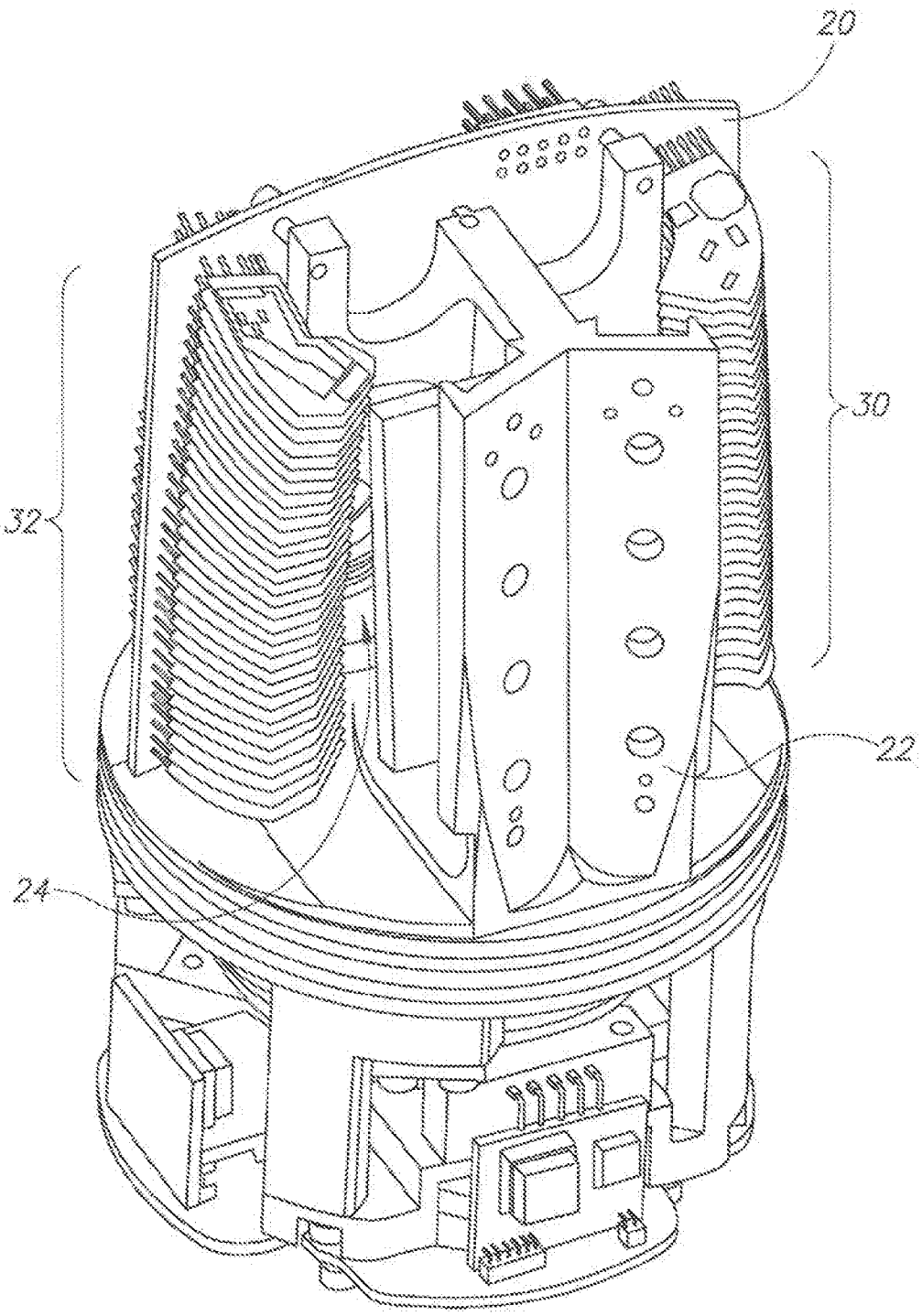
FIG. 8 is a back perspective view of the LiDAR system as shown in FIG. 5.

One of the advantages of mounting emitters and detectors on individual hybrid boards is the ability to then secure the individual hybrid boards to the motherboard in a vertically aligned configuration. In the illustrated version, the detectors are positioned in a first vertical alignment along a first vertical axis while the emitters are positioned in a second vertical alignment along a second vertical axis, with the first and second vertical axes being parallel and next to one another. Thus, as best seen in FIGS. 5 and 8, the hybrid boards carrying the emitters and detectors are mounted in vertical stacks that allow the sensor head to have a smaller diameter than a differently configured sensor having emitters and detectors positioned about the circumference of the system. Accordingly, the configuration reduces the overall size and requires less energy for spinning by moving more of the weight toward the center of the sensor.

As further shown in FIG. 8, the preferred version incorporates a plurality of detectors (in this case, 32 of them) mounted to an equal number of detector hybrids 32. The system likewise has the same number of emitters mounted to an equal number of emitter hybrids 30. In the preferred version, the system therefore has one emitter per hybrid and one detector per hybrid. In other versions this may be varied, for example to incorporate multiple emitters or detectors on a single hybrid. The emitter and detector hybrids are connected to a common motherboard 20, which is supported by a frame 22. The motherboard has a central opening 24 that is positioned to allow emitted and received pulses to pass through the motherboard. Because the lenses are positioned over the middle of the motherboard, the central opening is configured to be adjacent the lenses to allow light to pass through the portion of the motherboard that is next to the lenses.

The density of emitter/detector pairs populated along the vertical FOV is intentionally variable. While 32 pairs of emitters and detectors are shown in the illustrated versions, the use of hybrids and a motherboard allows for a reduction in the number of emitters and detectors by simply removing or not installing any desired number of emitter/detector pairs. This variation of the invention cuts down on the number vertical lines the sensor produces, and thus reduce cost. It is feasible that just a few emitter/detector pairs will accomplish the goals of certain autonomous vehicles or mapping applications. For some uses increased density is desirable to facilitate seeing objects at further distances and with more vertical resolution. Other uses exploit the fact that there is a direct relationship between the number of emitter detector pairs and sensor cost, and do not need the full spread of vertical lasers to accomplish their sensor goals.

Alternatively, multiple emitters and detectors can be designed and mounted onto the hybrid boards at slightly different vertical angles, thus increasing the density of vertical FOV coverage in the same footprint. If, for example, two emitters and two detectors were mounted on each of the hybrids shown in FIGS. 6 and 7 with slight vertical offsets, the design would incorporate 64 emitters and detectors rather than 32. This example design describes two emitters and detectors mounted per board, but there is no practical limit to the number of emitters and detectors that may be mounted on a single board. The increased number of emitters and detectors may be used to increase the field of view by adjusting the relative orientation, or may be used to increase the density of points obtained within the same field of view.

Another design feature of the preferred version is the vertical motherboard on which the main electronics that control the firing of the lasers and the capturing of returns are located. As noted above, the motherboard is mounted vertically, defining a plane that is preferably parallel to the central axis 13 (see FIG. 3) about which the system will rotate. While the motherboard is preferably parallel to this axis of rotation, it may be inclined toward a horizontal plane by as much as 30 degrees and still be considered substantially vertical in orientation. The emitter and detector hybrid boards are aligned and soldered directly to this vertical motherboard, thus providing for small overall head size and increased reliability due to the omission of connectors that connect the laser boards with the motherboard. This board is mechanically self-supported, mounted to a frame 22 that fixes it rigidly in position in a vertical orientation so that it spins with the rotating sensor head. The insertion of the hybrid boards can be automated for easy assembly. Prior art sensors exclusively employ motherboard design requiring connectors and cables between the emitters and the motherboard. The positioning and configuration of the motherboard as shown overcomes these problems.

Figure 9:
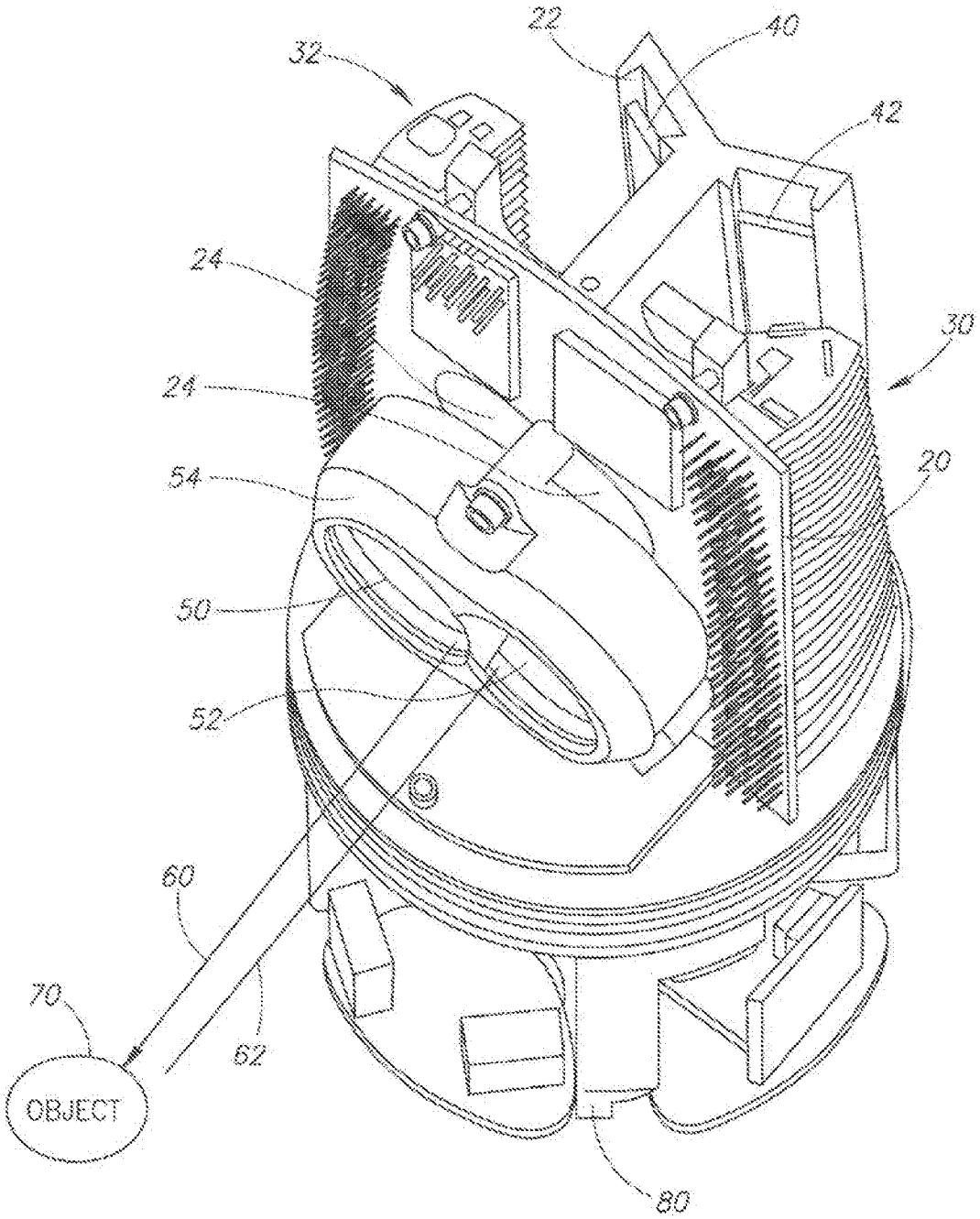
FIG. 9 is a top perspective view of the LiDAR system as shown in FIG. 5.

Another feature of the vertical motherboard design is its proximity inside the sensor head. In order to optimize space, the motherboard is positioned between the mirror and the lenses, as best seen in FIG. 9. Thus, as shown, the sensor head includes one or more lenses 50, 52 supported within a lens frame 54 positioned at a front side of the sensor head. One or more mirrors 40, 42 are positioned at the opposite side of the sensor head and mounted to the frame 22. In the illustrated version, separate mirrors 40, 42 are used for the emitter and detectors, respectively. Most preferably, the frame 22 is a unitary frame formed from a single piece of material that supports the motherboard and the mirrors.

This configuration allows the hybrid emitters to fire rearward into the first mirror 40, wherein the light then reflects off the mirror and travels through the hole 24 in the motherboard 20, through the lens 50 and so that the emitted light 60 travels out to the target 70. This configuration further increases the net focal length of the light path while retaining small size. Likewise the returning light 62 passes through the detector lens 52, through the hole 24 in the motherboard to the opposite mirror 52 and is reflected into the corresponding detector.

Another benefit of the vertical motherboard design is that it facilitates the goal of balancing the sensor head both statically and dynamically to avoid shimmy and vibration during operation. Most preferably, the various components are positioned to allow a near-balanced condition upon initial assembly that requires a minimum of final static and dynamic balancing counterweights. As best seen in FIG. 9, this balancing is obtained by positioning major portions of components about the circumference of the sensor head. More specifically, the lenses and frame are on one side while the mirrors and a generally T-shaped portion of the frame is diametrically opposite the lenses, with the mirrors and rearward portion of the frame configured to have a weight that is about equal to that of the lenses and lens frame. Likewise, the emitter and detector hybrids are carried on diametrically opposite sides of the sensor head, positioned at about a 90 degree offset with respect to the lens and mirror diameter. The motherboard is nearly along a diameter, positioned to counter balance the weight of the other components, such that the center of gravity is at the center of rotation defined by the center of the base 80.

When the present invention is incorporated into an autonomous navigation or mobile mapping vehicle, GPS and inertial sensors are often included to locate the vehicle in space and correct for normal vehicle motion. Inertial sensors often include gyros, such as fiber optic gyros (FOG), and accelerometers. In one embodiment, there is a 6-axis inertial sensor system mounted in the LiDAR base and the signals from the gyros and accelerometers are output along with the LiDAR distance and intensity data.

The separate location of emitters' and detectors' optical paths can create a parallax problem. When the emitters and detectors are separated by a finite distance there always exists a "blind" region nearest to the sensor in which objects cannot be illuminated or detected. Likewise, at long range the emitter's laser light becomes misaligned with its corresponding detector and creates a similar blind spot. The parallax problem is best seen with reference to FIG. 10. A representative emitter 170 transmits a light signal through a lens 172, with the propagated light signal traveling outward and toward a target in the distance. Light reflected from a target may return through a second lens 162 and onward toward a detector 160. The nonparallel orientation of the emitter and detector, however, creates nonparallel light emitter and detector paths. Consequently, there is a near blind spot 180 adjacent the system and a far blind spot 184 more distant from the system. In either of the two blind spots, light reflecting from an object will return along a path that cannot be received by the detector. The near blind spot extends for a distance "A" in front of the system, while the far blind spot extends in the region of distance "C" beyond the system. Between the two blind spots, in a distance defined by "B", the system will see an object in that light reflected from the object can return along a path that can be detected. Even within region B, however, there is a "sweet spot" 182 defined by the straight line paths of travel from the emitter and to the detector. For the sample embodiment shown in FIGS. 1 and 2 the "sweet spot" 182 for parallax alignment is approximately 100 feet from the centerline of the sensor. Inside of about 10 feet the emitter's light misses its corresponding detector entirely, shown at 180, and beyond approximately 240 feet, shown at 184, the signal becomes weak due to the misalignment of the emitter and detector in the opposite direction.

This effect can be alleviated in one version of the invention by having two "D"-shaped lenses 50, 52 (see FIG. 15), constructed for the emitter and detector, and having these two lenses attached to each other with a minimal gap in between. The close proximity of the conjoint lens system, best seen in FIG. 14, reduces the "blind" region to near zero, as shown by the parallel nature of the emitter's light 60 and detector's light path 62.

Due to the complex nature of the optical propagation in lenses, a lens array is usually needed to correct for various aberrations that are commonly associated with any optical design. For the purpose of constructing a conjoint lens system to overcome the parallax problem described with respect to FIG. 10, it is useful to have the first surface of the lens array being the largest pupil; that is, the optical rays entering the lens system should bend towards the center.

Figure 11:
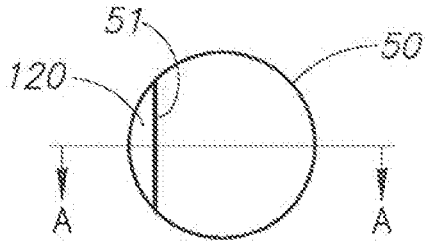
FIG. 11 is an exemplary front view of a lens assembly.
Figure 15:
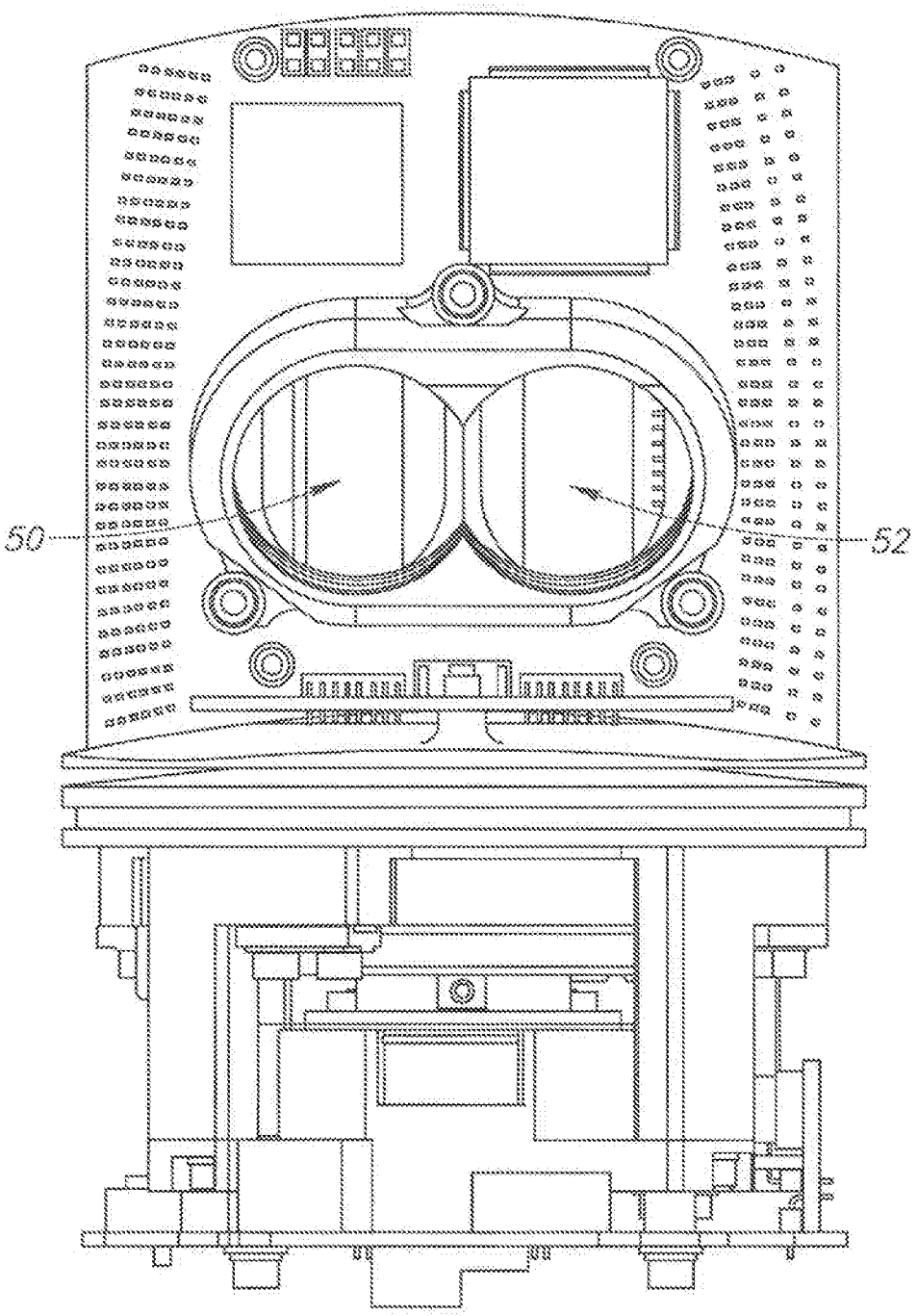
FIG. 15 is a front view of the LiDAR system as shown in FIG. 5.
Figure 16:
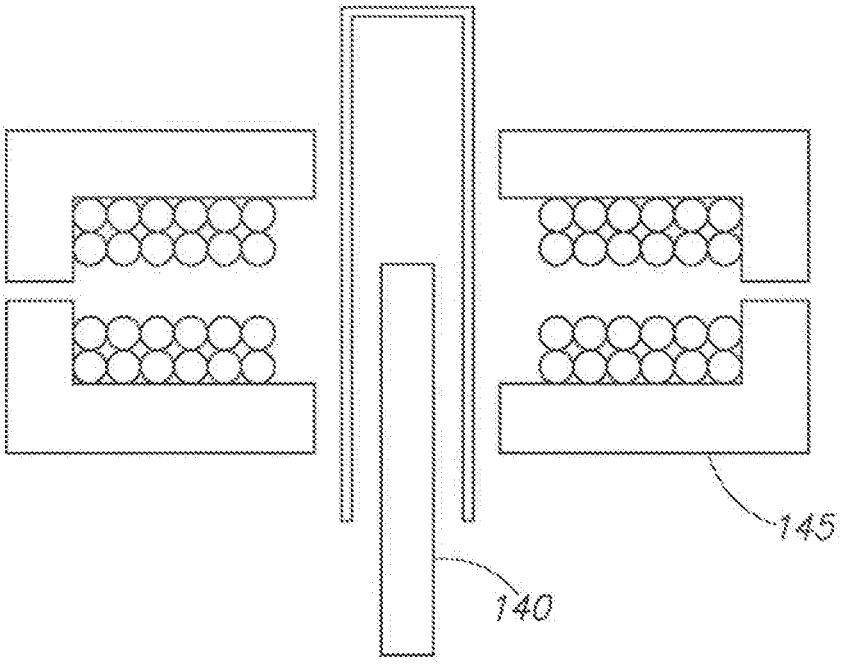
FIG. 16 is an exemplary view of a rotary coupler for coupling a housing to a rotating head assembly.

FIG. 11 illustrates a front view of a lens array 50. Though indicated as the emitter lens array, it may also be illustrative of the detector lens array as well. In order to form a D-shaped lens, an edge 51 of the otherwise circular lens is cut away from the lens, removing a left edge 120 of the otherwise circular lens. The resulting lens is somewhat D-shaped, having a vertical left edge. The use of a D-shaped lens array is advantageous in that D-shaped lens arrays for the emitter and detector may be placed back-to-back to form "conjoined" D-shape lens arrays as best seen in FIG. 15. Placing the vertical edges of the D-shapes adjacent one another allows the otherwise circular lenses to be much closer to one another than would be the case if using circular lenses which would only allow for tangential contact between the lens arrays.

Figure 12:
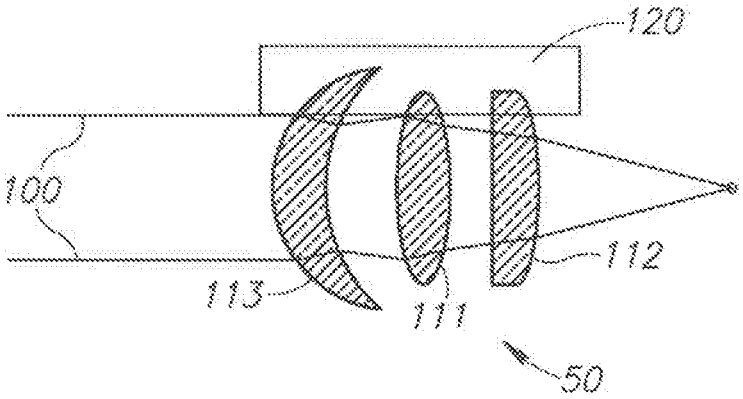
FIG. 12 is a sectional view of a lens assembly, taken along line A-A in FIG. 11.

The creation of D-shaped lenses and the use of a conjoined pair of D-shaped lens arrays, however, brings a potential signal loss. FIG. 12 illustrates a correct design of the lens array, shown in sectional view taken along lines A-A from FIG. 11. In this illustration the lens array includes a first lens 113, a second lens 111, and a third lens 112. The input rays 100 always bend towards the center in this lens array. Consequently, when a D-shaped cut is made (that is, cutting off a portion of one side of each of the lenses in the area indicated by the shaded region 120), there is no loss of light. As the shaded region indicates, all of the light entering the first lens 113 travels through the entire lens array to the mirror.

Figure 13:
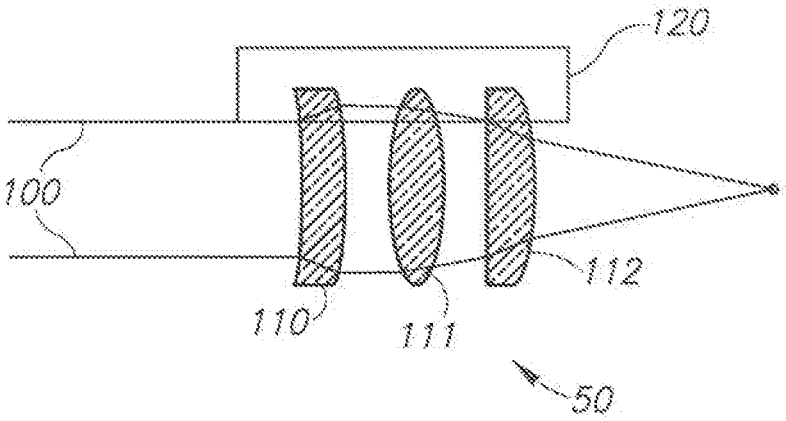
FIG. 13 is a sectional view of an alternate lens assembly, taken along line A-A in FIG. 11.

FIG. 13 illustrates an incorrect design having a similar array of three lenses 110, 111, 112. In this case, the front lens 110 is differently shaped and some of the input light rays 100 bend away from the center as they travel through the front lens. A cut through the ends of one side of this lens array would result in the loss of some of the light entering the array, as indicated in the shaded region 120 in FIG. 12.

By configuring the lenses in an ideal fashion as illustrated in FIG. 12, a portion of each side of the lens array may be cut in the form of a D-shape. This creates a straight edge along the sides of each lens in the array, allowing the straight sides of the D's forming each lens array to be positioned closely adjacent one another. In this sense, the term "closely adjacent" is understood to mean either in contact with one another or positioned such that the center of the lenses are closer to one another than they could be without the D-shaped cut. As best see in FIG. 15, the two lens arrays 50, 52 are positioned closely adjacent one another with the straight sides back-to-back to form conjoined D-shaped lens arrays. As described above, a first lens array 50 serves as the emitter lens array while the adjacent second lens array 52 serves as the detector lens array.

Figure 10:
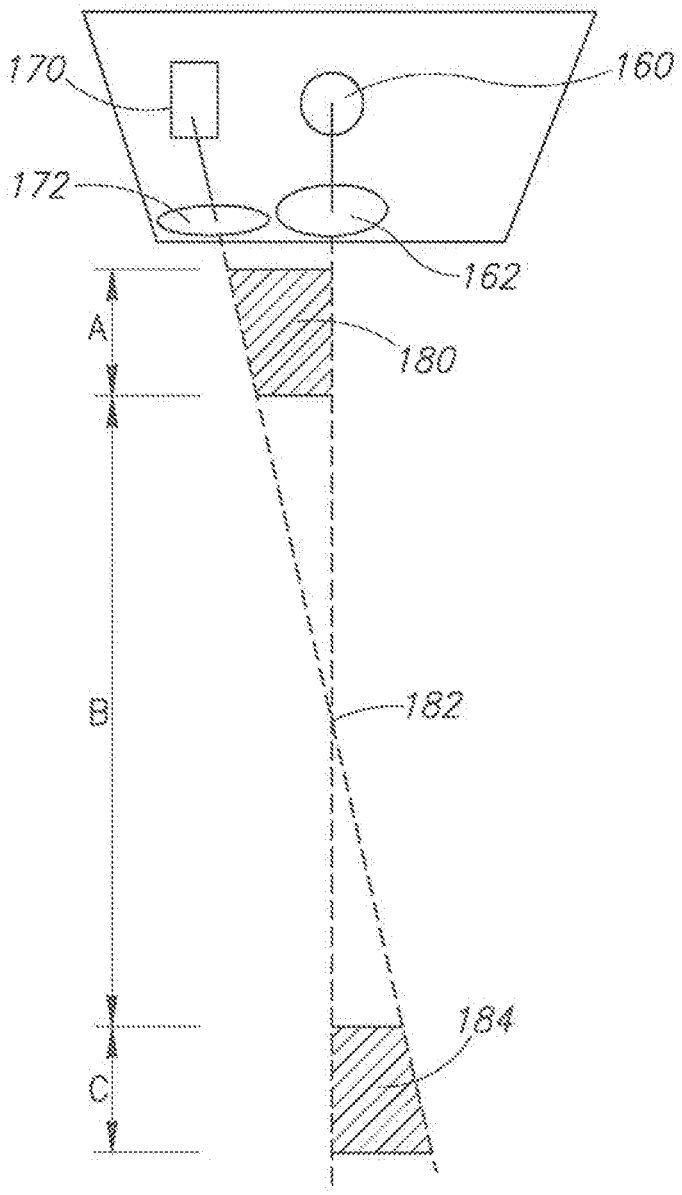
FIG. 10 is an exemplary view of a LiDAR system with a potential parallax problem.
Figure 14:
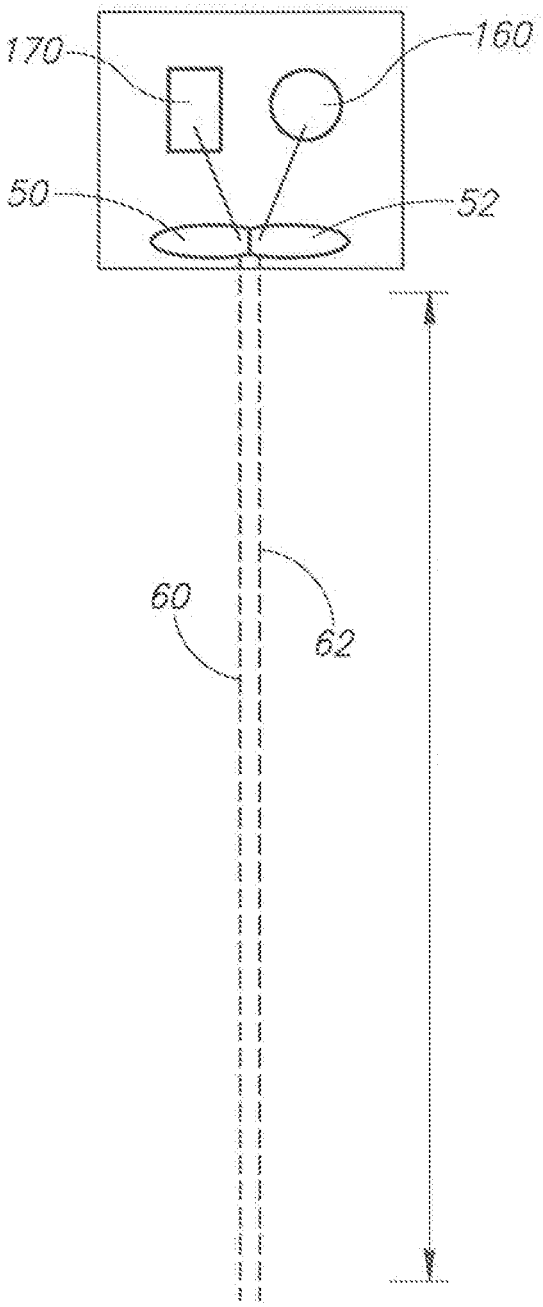
FIG. 14 is a representative view of a conjoined D-shaped lens solving the parallax problem of FIG. 10.

FIG. 14 illustrates an advantage of the conjoint D-shaped lens design, particularly in how it overcomes the parallax problem illustrated in FIG. 10. In this case, light emerging from the emitter 170 is directed to a first D-shaped lens 50. Most preferably, the emitter is oriented to direct its light path toward a position just inward of the straight side edge of the D-shape. Because of the lens array configuration of the type described in FIG. 12, the light emerges from the first lens 50 in a straight line 60 that can be directed radially away from the sensor head. Likewise, light reflected from the distant object will return along a return path 62 that is parallel to the emitter light path. The closely parallel return path will travel through the second, adjacent conjoined D lens array 52, entering the lens array at a position just inward of the straight side edge of the D-shape, where it is then directed to the detector 160. Consequently, there is no blind spot as with conventional lenses and the parallax problem is resolved.

Another unique design consideration for the preferred implementation addresses the need to transfer power and signal up to the head, and receive signal and offer grounding down from the head. Off the shelf mercury-based rotary couplers are too unreliable and too big for this problem. In one embodiment, shown in FIG. 16, the use of a rotary transformer 145 enables sending power up to the head, and the use of a capacitive coupler 140 down from the head to accommodate these requirements. A phase modulation scheme allows for communication to the head from the base using serial commands in order to instruct the head to limit horizontal field of view, fire all lasers at full power, update its firmware, and other commands.

Figure 17:
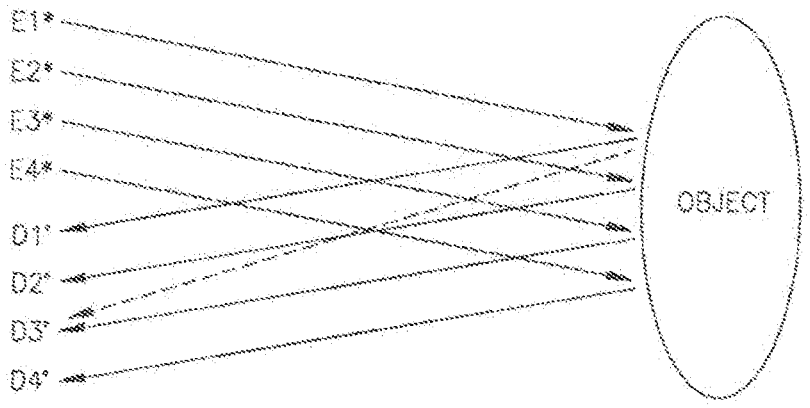
FIG. 17 is an illustration of a potential crosstalk problem.
Figure 18:
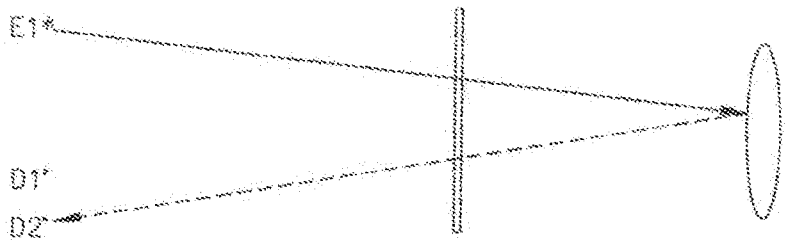
FIG. 18 is an illustration of a further potential crosstalk problem.

It is also desired to have the distance returns of the LiDAR scanner be as accurate as possible and be free of spurious images or returns. Firing multiple lasers at once can create a crosstalk condition where the light emitted from one laser inadvertently is detected by the detector of another laser, thus giving a false return. Thus, with reference to FIG. 17, if emitters E1 through E4 all fire at once, their returns would be intended to be received by emitters D1 through D4. But depending on the positioning and configuration of the object from which the light returns, light from one of the emitters may be directed to the wrong detector. For example, as indicated in FIG. 17, light from emitter E1 may end up directed to detector D3, as indicated by the dotted line return path. This would be an invalid return, and the system would erroneously associate it with light sent from emitter E3, thereby creating a faulty pixel in the point cloud.

A similar error can occur if adjacent lasers are fired in a sequential fashion. Thus, with reference to FIG. 16, firing a single emitter E1 may result in light being detected at detector D2 rather than D1. This may most commonly occur when light from emitter E1 travels beyond the true range of the sensor but is reflected from a particularly reflective object, such as a stop sign covered with reflective paint. The firing of adjacent emitters in order makes this form of cross-talk more likely.

In accordance with a preferred version of the invention, the emitters are fired in a non-adjacent single laser firing order. This means that only one emitter detector pair is active at any given time, and at no time do adjacent emitters and detectors fire in sequence. Most preferably there is as much distance as possible between the emitters that are fired in order. Thus, if there are 32 emitters in a vertical stack, the emitters would be assigned labels E1 representing the top-most emitter and then sequentially numbered through E32 representing the bottom emitter in the stack. Emitter E1 (at the top) would be fired first, followed by emitter E17 (in the middle of the stack), then E2, E18, E3, E19, and so on, ending with E16 and E32 before starting over again at the beginning This pattern begins with the top emitter and the middle emitter, dividing the stack into two groups. It then alternates firing one from each group, moving from the top of each half-stack and proceeding sequentially down each half-stack of emitters in an this alternating fashion and then repeating. This pattern ensures the largest possible distance between fired lasers, thereby reducing the chance of cross-talk.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

[1. A LiDAR-based sensor system comprising:

a base;

head assembly;

a rotary component configured to rotate the head assembly with respect to the base, the rotation of the head assembly defining an axis of rotation;

an electrical motherboard carried in the head assembly, the motherboard defining a plane and being positioned substantially parallel to the axis of rotation;

a lens positioned on the head assembly on a first side of the motherboard;

a mirror positioned on the head assembly on a second side of the motherboard;

a plurality of photon transmitters mounted to a plurality of emitter circuit boards, the plurality of emitter circuit boards being mounted directly to the motherboard; and a plurality of detectors mounted to a plurality of detector circuit boards, the plurality of detector circuit boards being mounted directly to the motherboard.]

[2. The sensor system of claim 1, wherein the lens comprises an emitter lens and a detector lens, the emitter lens and the detector lens being positioned adjacent one another; and the mirror comprises an emitter mirror and a detector mirror;

wherein the emitter mirror is positioned within the head assembly to reflect light from the plurality of photon transmitters through the emitter lens, and the detector mirror is positioned within the head to reflect light received through the detector lens toward the plurality of detectors.]

[3. The sensor system of claim 2, further comprising a unitary support structure, the motherboard, detector lens, emitter lens, detector mirror, and emitter mirror all being secured to the unitary support structure.]

[4. The sensor system of claim 2, wherein the plurality of emitters are oriented to transmit light from the second side of the motherboard toward the emitter mirror.]

[5. The sensor system of claim 4, wherein the motherboard comprises a central opening, the central opening being positioned to allow light from the emitters to pass from emitter mirror through the central opening and toward the emitter lens.]

[6. The sensor system of claim 5, wherein the central opening is further positioned to allow light to pass from the detector lens through the central opening and toward the detector mirror.]

[7. The sensor system of claim 2, wherein the plurality of emitter circuit boards are secured to the motherboard to form a first vertical stack.]

[8. The sensor system of claim 7, wherein the first vertical stack of emitter circuit boards forms an angularly fanned array.]

[9. The sensor system of claim 7, wherein the plurality of detector circuit boards are secured to the motherboard to form a second vertical stack, the first vertical stack of emitter circuit boards being positioned substantially parallel to the second vertical stack of detector circuit boards.]

[10. The sensor system of claim 9, wherein the second vertical stack of detector circuit boards forms an angularly fanned array.]

[11. The sensor system of claim 2, wherein the emitter lens comprises a first D-shaped lens and the detector lens comprises a second D-shaped lens, a respective vertical side of each of the first D-shaped lens and the second D-shaped lens being positioned closely adjacent one another to form a conjoined D-shaped lens array.]

[12. The sensor system of claim 11, wherein the first D-shaped lens comprises a first plurality of lenses, and wherein the second D-shaped lens comprises a second plurality of lenses.]

[13. The sensor system of claim 2, wherein the plurality of emitter circuit boards are secured to the motherboard to form a first vertical stack, the first vertical stack being divided into at least two groups of emitters, each of the at least two groups comprising several emitters from the plurality of emitters such that the at least two groups form non-overlapping subsets of the plurality of emitters, the sensor further having a control component to control the firing of the emitters such that one emitter is fired at a time, the control component further causing firing from one of the at least two groups and then the other of the at least two groups in an alternating fashion.]

[14. The sensor system of claim 13, wherein the at least two groups comprises:

a first group forming a first portion of the first vertical stack and organized sequentially from a first top position to a first bottom position; and a second group forming a remaining portion of the first vertical stack organized sequentially from a second top position to a second bottom position;

whereby the control component causes firing of the emitters to alternate between the first group and the second group, and further causes firing within the first group to proceed sequentially and firing within the second group to proceed sequentially.]

[15. The sensor system of claim 2, wherein the rotary component further comprises a capacitive coupler.]

[16. A LiDAR-based sensor system comprising:

a base;

head assembly;

a motor configured to rotate the head assembly with respect to the base, the rotation of the head assembly defining an axis of rotation;

an electrical motherboard carried in the head assembly;

a plurality of photon transmitters mounted to a plurality of emitter circuit boards, the plurality of emitter circuit boards being mounted to the motherboard;

a plurality of detectors mounted to a plurality of detector circuit boards, the plurality of detector circuit boards being mounted to the motherboard;

an emitter mirror supported within the head assembly;

a detector mirror supported within the head assembly; and a conjoined D-shaped lens assembly, the lens assembly forming an emitter portion and a detector portion;

wherein the motherboard is a unitary component for mounting the plurality of emitter circuit boards and the plurality of detector circuit boards, the motherboard being positioned between the emitter mirror and the detector mirror on a first side and the lens assembly on the other side, the motherboard further having an opening to allow light to pass between the lens assembly and either the detector mirror or the emitter mirror;

whereby light transmitted by one of the plurality of emitters is reflected from the emitter mirror and passes through the emitter portion of the lens assembly, and light received by the detector portion of the lens assembly is reflected by the detector mirror and received by one of the plurality of detectors.]

[17. The sensor system of claim 16, wherein the motherboard defines a plane that is parallel to the axis of rotation.]

[18. The sensor system of claim 17, further comprising:

a control component for causing the firing of the plurality of emitters; and further wherein there are n emitters in the plurality of emitters, the n emitters being positioned in a vertical stack from 1 to n, the plurality of emitters being divided into two groups, including a first group of emitters from 1 to n/2 and a second group of emitters from n/2+1 to n; wherein the control component causes the emitters to fire alternatingly between the first group and the second group, and to fire sequentially within each group such that emitter 1 and emitter n/2+1 fire sequentially.]

*19. A LiDAR-based sensor system comprising:*

*a base having a head assembly and a rotary component configured to rotate the head assembly with respect to the base, the head assembly further having a circumference spaced apart from an axis of rotation of the head assembly;*

*an electrical motherboard carried in the head assembly;*

*a lens positioned on the head assembly along the circumference of the head assembly;*

*a mirror positioned on the head assembly along the circumference of the head assembly;*

*a plurality of transmitters carried on the head assembly for rotation with the head assembly, the plurality of transmitters positioned to transmit light pulses through the lens, wherein the plurality of transmitters is arranged in a fan pattern in which each successive transmitter is inclined at an angle with respect to an adjacent transmitter; and*

*a plurality of detectors carried on the head assembly for rotation with the head assembly, the plurality of detectors positioned to receive the light pulses after reflection from one or more surfaces.*

*20. The sensor system of claim 19, wherein each of the plurality of transmitters is located on a corresponding one of a plurality of emitter boards.*

*21. The sensor system of claim 20, wherein the plurality of emitter boards is arranged in the fan pattern.*

*22. The sensor system of claim 21, wherein the fan pattern is a vertical fan pattern.*

*23. The sensor system of claim 19, wherein each successive board is inclined at an additional one and one-third degree angle with respect to a next adjacent board.*

*24. The sensor system of claim 19, wherein the angle comprises a plurality of angles, whereby the plurality of transmitters is arranged non-uniformly within the fan pattern.*

*25. The sensor system of claim 19. wherein the angle comprises a plurality of angles, and further wherein the plurality of transmitters is arranged such that they form the plurality of angles between adjacent transmitters from among the plurality of transmitters.*

*26. A LiDAR-based sensor system comprising:*

*a base having a head assembly and a rotary component configured to rotate the head assembly with respect to the base, the head assembly further having a circumference spaced apart from an axis of rotation of the head assembly;*

*an electrical motherboard carried in the head assembly;*

*a lens positioned on the head assembly along the circumference of the head assembly;*

*a mirror positioned on the head assembly along the circumference of the head assembly;*

*a plurality of transmitters carried on the head assembly for rotation with the head assembly, the plurality of transmitters positioned to transmit light pulses through the lens; and*

*a plurality of detectors carried on the head assembly for rotation with the head assembly, the plurality of detectors positioned to receive the light pulses after reflection from one or more surfaces;*

*wherein the plurality of transmitters and the plurality of detectors form a plurality of transmitter-detector pairs that is arranged in a vertical fan pattern having a density that is variable along a vertical field of view.*

*27. The sensor system of claim 26, wherein the plurality of transmitters is located on a plurality of emitter boards, and further wherein the fan pattern density is variable by increasing or decreasing the number of emitter boards mounted to the head assembly.*

*28. The sensor system of claim 26, wherein the plurality of transmitters is located on a plurality of emitter boards, the transmitters mounted to the plurality of emitter boards at a plurality of different angles.*

* * * * *